(12) United States Patent
Milchtaich

(10) Patent No.: US 11,272,443 B2
(45) Date of Patent: Mar. 8, 2022

(54) DISTRIBUTED WIRELESS COMMUNICATION ACCESS SECURITY

(71) Applicant: CORONET CYBER SECURITY LTD., Beer-Sheva (IL)

(72) Inventor: Doron Milchtaich, Rehovot (IL)

(73) Assignee: CORONET CYBER SECURITY LTD., Beer-Sheva (IL)

( * ) Notice: Subject to any disclaimer, the term of this patent is extended or adjusted under 35 U.S.C. 154(b) by 72 days.

(21) Appl. No.: 16/604,826

(22) PCT Filed: Apr. 19, 2017

(86) PCT No.: PCT/IB2017/052229
§ 371 (c)(1),
(2) Date: Apr. 2, 2020

(87) PCT Pub. No.: WO2018/193288
PCT Pub. Date: Oct. 25, 2018

(65) Prior Publication Data
US 2020/0245149 A1    Jul. 30, 2020

(51) Int. Cl.
*H04W 48/20* (2009.01)
*G06F 16/22* (2019.01)
(Continued)

(52) U.S. Cl.
CPC ........... *H04W 48/20* (2013.01); *G06F 16/22* (2019.01); *G06F 16/252* (2019.01); *H04L 63/20* (2013.01);
(Continued)

(58) Field of Classification Search
CPC ... H04W 48/20; H04W 12/37; H04W 12/082; H04W 12/122; H04W 12/08; H04W 48/02; H04W 48/16; G06F 16/22; G06F 16/252; G06F 16/00; G06F 2221/2149; G06F 21/6218; H04L 63/20; H04L 63/1483
See application file for complete search history.

(56) References Cited

U.S. PATENT DOCUMENTS 8,799,993 B1 * 8/2014 Efrati .................... H04L 63/205
726/1
2004/0198220 A1  10/2004 Whelan et al.
(Continued)

OTHER PUBLICATIONS

International Search Report issued in PCT/IB2017/052229 dated Jul. 27, 2017 (2 pages).
(Continued)

*Primary Examiner* — Christopher A Revak
(74) *Attorney, Agent, or Firm* — Acuity Law Group, PC; Michael A. Whittaker

(57) ABSTRACT

A computer implemented method of distributed wireless communications access security, the method comprising steps a computer processor of a server computer is programmed to perform, the steps comprising: receiving data characterizing a device, selecting a policy from a database of policies using the received data characterizing the device, for the device, the policy defining a criterion for determining which wireless access points are allowable, and communicating data defining the selected policy to the device, for the device to use for determining whether access to an active wireless access point is allowable.

21 Claims, 16 Drawing Sheets

(51) Int. Cl.
*G06F 16/25* (2019.01)
*H04L 29/06* (2006.01)
*H04W 12/08* (2021.01)
*H04W 12/37* (2021.01)
*H04W 12/082* (2021.01)
*H04W 12/122* (2021.01)

(52) U.S. Cl.
CPC ......... *H04W 12/08* (2013.01); *H04W 12/082* (2021.01); *H04W 12/122* (2021.01); *H04W 12/37* (2021.01); *H04L 63/1483* (2013.01)

(56) References Cited

U.S. PATENT DOCUMENTS

| | | | |
|---|---|---|---|
| 2006/0094400 A1* | 5/2006 | Beachem | H04M 7/121 455/410 |
| 2009/0137228 A1* | 5/2009 | Horn | H04W 48/02 455/411 |
| 2009/0245176 A1 | 10/2009 | Balasubramanian et al. | |
| 2011/0093913 A1* | 4/2011 | Wohlert | H04W 12/082 726/1 |
| 2014/0282860 A1* | 9/2014 | Efrati | H04W 24/02 726/1 |
| 2015/0020214 A1 | 1/2015 | Copsey | |
| 2015/0074769 A1 | 3/2015 | Hunukumbure et al. | |
| 2016/0226705 A1* | 8/2016 | Toner | H04L 41/0893 |
| 2017/0012935 A1* | 1/2017 | Raman | H04L 61/2092 |
| 2017/0026382 A1* | 1/2017 | Trigger | H04L 63/0227 |
| 2018/0338274 A1* | 11/2018 | Gallagher | H04W 48/02 |
| 2021/0051069 A1* | 2/2021 | Stammers | H04L 67/28 |

OTHER PUBLICATIONS

Written Opinion issued in PCT/IB2017/052229 dated Jul. 27, 2017 (6 pages).

\* cited by examiner

3700

| Email | Devices Active/All | Policy | Assignment Basis |
|---|---|---|---|
| Abe@AB27.co.uk | 0/3 | Policy 1 | Management |
| Mike@AB27.co.uk | 0/1 | Policy 2 | IT |
| Kim@AB27.co.uk | 1/3 | Policy 2 | IT |
| Dan@AB27.co.uk | 0/3 | Policy 1 | User Specific |
| Ari@AB27.co.uk | 0/3 | Policy 1 | Management |
| Jim69_4@yahoo.com | 1/1 | Default | |

Fig. 3G

DISTRIBUTED WIRELESS COMMUNICATION ACCESS SECURITY

CROSS-REFERENCE TO RELATED APPLICATIONS

The present invention is filed under 35 U.S.C. § 371 as the United States national phase of International Application No. PCT/IB2017/052229, filed Apr. 19, 2017, which designated the United States.

FIELD AND BACKGROUND OF THE INVENTION

Nowadays, millions of endpoint devices are involved in communication with wireless access points. The endpoint devices include, but are not limited to mobile phones, tablets, personal computers, points-of-sale devices, handheld terminals, controllers, telemetric devices, vehicle systems, various other devices often referred to as Internet of Things (IoT) devices, etc., as described in further detail hereinbelow.

Wireless communication usually requires that the device establish a wireless connection with a wireless access point that acts as part of a wireless network and that provides endpoint devices with access to the wireless network and/or to a wide area network such as the internet. A wireless access point may include but is not limited to a Wi-Fi access point of a wireless local area network (WLAN), a base station of a mobile telephony network, etc., as described in further detail hereinbelow.

However, many standard protocols for wireless communication in current use may be exploited using malicious access points, in an attempt at taking control of the endpoint device's traffic without raising suspicion.

Once such a malicious access point gains control of the endpoint device's traffic, a malicious entity operating the malicious access point may be able to capture voice, text (say SMS), and data messages sent from and to the endpoint device.

The malicious access point may also be used to prevent secured communication, divert traffic to malicious servers (say for credential phishing), modify and insert messages, use port exploitation and code injection, break SSL (Secure Sockets Layer) protection, manipulate SSL certificates, steal user credentials, etc.

SUMMARY OF THE INVENTION

According to one aspect of the present invention there is provided a computer implemented method of distributed wireless communications access security, the method comprising steps a computer processor of a server computer is programmed to perform, the steps comprising: receiving data characterizing a device, selecting a policy from a database of policies using the received data characterizing the device, for the device, the policy defining a criterion for determining which wireless access points are allowable, and communicating data defining the selected policy to the device, for the device to use for determining whether access to an active wireless access point is allowable.

According to a second aspect of the present invention there is provided an apparatus for distributed wireless communications access security, the apparatus comprising: a computer processor of a server computer, a device data receiver, implemented on the computer processor, configured to receive data characterizing a device, a policy selector, in communication with the device data receiver, configured to select a policy from a database of policies using the received data characterizing the device, for the device, the policy defining a criterion for determining which access points are allowable, and a policy data communicator, in communication with the policy selector, configured to communicate data defining the selected policy to the device, for the device to use for determining whether access to an active wireless access point is allowable.

According to a third aspect of the present invention there is provided a non-transitory computer readable medium storing computer processor executable instructions for performing steps of distributed wireless communications access security, the steps comprising: receiving data characterizing a device, selecting a policy from a database of policies using the received data characterizing the device, for the device, the policy defining a criterion for determining which access points are allowable, and communicating data defining the selected policy to the device, for the device to use for determining whether access to an active wireless access point is allowable.

According to a fourth aspect of the present invention there is provided a computer implemented method of distributed wireless communications access security, the method comprising steps a computer processor of a device is programmed to perform, the steps comprising: receiving data defining a policy selected by a server computer for the device from a database of policies using data characterizing the device, the policy defining a criterion for determining which wireless access points are allowable, and determining whether access to an active wireless access point is allowable, using the received data defining the policy selected for the device.

According to a fifth aspect of the present invention there is provided an apparatus for distributed wireless communications access security, the apparatus comprising: a computer processor of a device, a policy data receiver, implemented on the computer processor, configured to receive data defining a policy selected by a server computer for the device from a database of policies using data characterizing the device, the policy defining a criterion for determining which wireless access points are allowable, and an access allowability determiner, in communication with the policy data receiver, configured to determine whether access to an active wireless access point is allowable, using the received data defining the policy selected for the device.

According to a sixth aspect of the present invention there is provided a non-transitory computer readable medium storing computer processor executable instructions for performing steps of distributed wireless communications access security on a device, the steps comprising: receiving data defining a policy selected by a server computer for the device from a database of policies using data characterizing the device, the policy defining a criterion for determining which access points are allowable, and determining whether access to an active wireless access point is allowable, using the received data defining the policy selected for the device.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 3G is a simplified diagram illustrating a sixth exemplary page of an exemplary GUI of an apparatus for distributed wireless communications access security, according to an exemplary embodiment of the present invention.

DESCRIPTION OF THE PREFERRED EMBODIMENTS

Figure 1:
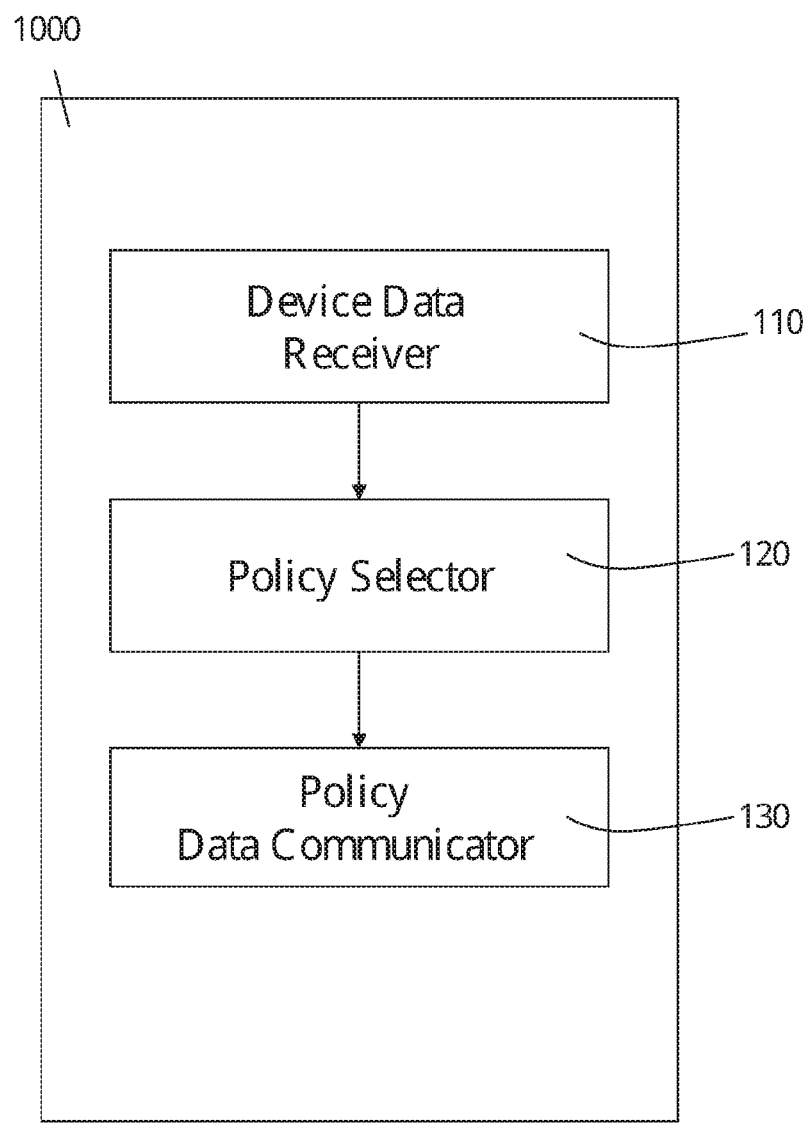
FIG. 1 is a simplified block diagram schematically illustrating a first exemplary apparatus for distributed wireless communications access security, according to an exemplary embodiment of the present invention.

The present embodiments comprise an apparatus and a method of distributed wireless communications access security.

Criminals, experts involves in industrial espionage, and others have learnt to exploit wireless communications, by stealing sensitive information from client devices (say from smart phones or tablet computers) using existing access points by using malicious wireless access points set by themselves to still information, etc.

For example, criminals may install and use a malicious access point to attack client devices in use by employees of an organization. Unaware of the malicious nature of the access point, the client devices may connect to the malicious access point, and become the criminals' victims in phishing attacks, as known in the art.

A phishing attack usually involves an attempt to acquire sensitive information (say usernames, passwords, credit card details, etc.) from users of client devices.

In a phishing attack, an attacker may use a malicious wireless access point which appears innocent to a user. A user of a client device of an organization (especially when the user is in a public place such as a restaurant or a shopping center) may connect his client device to the attacker's malicious wireless access point, and access the organization's computing resources (files, databases, etc.).

As a result, the attacker may gain access to the sensitive information that belongs to the organization, say to information downloaded to the user's client device, from one of the organization's information systems, databases, etc., as described in further detail hereinbelow.

In such attacks, the attacker usually takes advantage of flaws which are inherent to many standard protocols in use on wireless communications networks, without breaking any formal protocol based rule applied by the networks. Consequently, security mechanisms based on compliance with protocol rules in use on the wireless communications networks are not effective against the attacks.

Indeed, over the past few years, wireless Internet communication has become a key part of daily enterprise networking, and has been used for transmitting sensitive personal, financial, and intellectual property data of many organizations.

When present within premises of an enterprise, endpoint devices in use by enterprise employees usually communicate via wireless access points that belong to the enterprise and are controlled by the enterprise (say for blocking employee access to adult websites).

However, enterprise employees˜ devices may also communicate via wireless access points that do not belong to the enterprise, say to public wireless networks operated by nearby businesses. Further, when the employees are out of enterprise offices, enterprise employees˜ devices may connect to wireless home networks, public networks at public places such as hotels or airports, wireless networks of other enterprises, etc.

With exemplary embodiments of the present invention, an enterprise would potentially have more control over what networks are used by devices in use by the enterprise˜s employees, agents, etc., for communicating with the enterprise˜s information systems, accounts with cloud based storage services provided to enterprise by third parties, and other computing resources.

According to an exemplary embodiment, a server computer of an organization (say a commercial firm or a government agency) may implement a method of distributed wireless communications access security.

In the method˜s steps, there is received data characterizing a device, say data that indicates the type of the device (say a Point-of-Sale terminal vs. a smart phone, laptop computer, or other personal computer), data indicating whether the device belongs to the organization or not, etc., as described in further detail hereinbelow.

The data characterizing the device is used by the server computer, for selecting a policy from a database of policies, for the device.

The policy defines a criterion for determining which wireless access points are allowable. The policy may define the criterion using an allowable access points list (i.e. a white list), a non-allowable access points list (i.e. a black list), an indication on authentication protocol(s) that an access point has to implement in order to be allowable, etc., or any combination thereof, as described in further detail hereinbelow.

In one example, the database is a relational database, as known in the art.

In the example, each policy is represented in the database as a set of related database tables, and is associated with a key (i.e. a combination of field values) that defines the circumstances under which the policy applies, and that is also used to select the policy for the device, from the database.

Thus, in the example, one policy may be associated with a key that indicates that the policy applies only if the device is a Point-of-Sale Terminal, whereas a second policy may be associated with a key that indicates that the policy applies only if the device is a smart phone or personal computer that is owned by the organization.

After selecting the policy, the server computer communicates data defining the selected policy to the device (say as a file or a message holding relevant data copied from the above mentioned relational database tables that represent the policy), say to a client application installed on the device, as described in further detail hereinbelow.

In the example, the client application receives the data defining the selected policy, and uses the data to provide a user with indications on wireless access point allowability, prevent or restrict communication between the device and a wireless access point not allowed by the policy, etc., as described in further detail hereinbelow.

Optionally, using the client application, the device further provides the server computer with data on compliance of the device with the policy, say on a deviation of the device from the policy (say by connecting to a wireless access point that does not use a protocol that the policy restricts to), as described in further detail hereinbelow.

The data on the compliance may be used to limit access of the device to enterprise˜s computing resources (say the enterprise˜s databases and third party cloud services accounts), to gather information on user compliance with the policy, and optionally, also to trigger a process of modifying the policy, as described in further detail hereinbelow.

That is to say that with an exemplary embodiment, an organization or other entity may be able to have at least some control over wireless communication of devices in use by the entity˜s employees, agents, etc., to access points.

For example, using some of the embodiments, an organization that blocks employee access to certain websites on the organization˜s own wireless network, may be able to prevent their employees from accessing the websites using access points that are not operated by the organization, as described in further detail hereinbelow.

Further, in some embodiments, an organization may be able to restrict access to enterprise computing resources based on employee compliance with the policies, and further, to improve the policies based on the data on compliance with the policies.

A client device according to the present embodiments may include, but is not limited to any device used for wireless communications.

For example, the client device may include, but is not limited to of wireless devices such as mobile phones (say smart phones), terminals, Laptop Computers, Handheld Point-of-Sale (POS) Terminals, Tablet Computers, Desktop Computers, remote utilities telemetric devices, vehicle devices, etc., as known in the art.

The client device may also be one of a variety of devices with internet connectivity (commonly referred to today as Internet-of-Things (IOT) devices) and other devices that can connect wirelessly to a communication network, as known in the art.

The wireless access point of the present embodiments may include any device used to wirelessly connect a client device to a communications network and provide access services to the client device or even to wirelessly and independently communicate with the client device (say without connecting the client device to any network or other party).

Exemplary wireless access points may include, but is not limited to wireless communication devices such as wireless local area network access points, Wi-Fi access points, radio base stations, Femto-Cell Base Stations, Cellular Base Stations, a standalone Bluetoothù or Wi-Fi communication device, etc., as know in the art.

In some examples, the access points may use second, third, or fourth generation (2G/3G/4G) and beyond mobile technologies or standards—say Global System for Mobile Communications (GSM), Code division multiple access (CDMA), Universal Mobile Telecommunications System (UMTS), Long-Term Evolution (LTE), etc., as know in the art.

The principles and operation of a method and an apparatus according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram schematically illustrating a first exemplary apparatus for distributed wireless communications access security, according to an exemplary embodiment of the present invention.

An apparatus 1000 for distributed wireless communications access security, according to one exemplary embodiment of the present invention, is implemented on a server computer which communicates with client devices such as a smart mobile phone, a tablet computer, a laptop computer, etc., as described in further detail hereinabove. The server computer may actually include two or more networked computers, as known in the art.

Optionally, the apparatus 1000 is implemented on an enterprise server computer of an organization, which server computer is in communication with client devices in use by the organization˜s employees, agents, suppliers, customers, other business partners, etc.

The apparatus 1000 includes the server computer's computer processor(s) and one or more additional parts described hereinbelow, such as the parts denoted 110-130 in FIG. 1.

The additional parts may be implemented as software—say by programming the computer processor to execute steps of the methods described in further detail hereinbelow, by hardware—say by electric circuits, computer memories, etc., or any combination thereof.

Thus, in an exemplary embodiment, the exemplary first apparatus 1000 includes a computer processor of the server computer.

The first apparatus 1000 further includes a device data receiver 110, implemented on the computer processor.

The device data receiver 110 receives data characterizing a device.

The data characterizing the device may be received from the device itself, from an administrator of the apparatus 1000, from a database or file that holds information on devices in use by enterprise employees and maps the employees to user groups, etc., as described in further detail hereinbelow.

The data characterizing a device may include, but is not limited to: the device type (say a Point-of-Sale terminal vs. a smart phone or a laptop computer), data on whether the device belongs to the organization or on user group(s) that the user of the device belong to, the device location, etc., as described in further detail hereinbelow.

The apparatus 1000 further includes a policy selector 120, in communication with the device data receiver 110.

The policy selector 120 selects a policy from a database of policies using the received data characterizing the device, for the device. The policy defines a criterion for determining which wireless access points are allowable.

Optionally, the policy selector further stores the policy selected for the device in a database (say in the database of policies) with data that indicate that the policy is assigned to the device.

The policy defines a criterion for determining which wireless access points are allowable. The policy may define the criterion using an allowable access points list (i.e. a white list), a non-allowable access points list (i.e. a black list), an indication on authentication protocol(s) that an access point has to implement in order to be allowable, etc., or any combination thereof, as described in further detail hereinbelow.

When using a white list or rather, a black list for defining the policy, each access point may be identified in that list using SSID (Service Set Identifier), BSSID (Basic Service Set Identifier), Cellular Operator˜s name, etc., as known in the art.

Additionally or alternatively, the policy may define a set of checks that a device assigned the policy needs to carry out for determining whether an access point is allowable, say using the client application, as described in further detail hereinbelow.

In one example, the database of the policies is implemented as a relational database, as known in the art.

In the example, each policy is represented in the database as a set of related database tables, and is associated with a key (i.e. a combination of field values) that defines the circumstances under which the policy applies, and according to which key the policy is selected for the device, from the database.

Thus, for example, one policy may be associated with a key that indicates that the policy applies only if the device is a Point-of-Sale Terminal, whereas a second policy may be associated with a key that indicates that the policy applies only if the device is a desktop computer assigned to a specific user, to a specific user group, etc.

The apparatus 1000 further includes a policy data communicator 130, in communication with the policy selector 120.

The policy data communicator 130 communicates data defining the selected policy to the device, say as a file or as a message holding relevant data copied from the above mentioned relational database tables that represent the policy. For example, the policy data communicator 130 may communicate the data defining the policy to a client application installed on the device, as described in further detail hereinbelow.

In one example, a client application receives the data defining the selected policy as a part of the application˜s first set up or rather later on, say as a message communicated to the client application by the policy data communicator 130, as described in further detail hereinbelow.

The data may thus be initial data (say data based a default policy) communicated by the policy data communicator 130 during installation of the client application, or rather be downloaded with the application prior to installation, say as a part of the application˜s code. The data may also be data communicated by the policy data communicator 130 to the device later, for replacing the initial (or other) data defining the selected policy, say upon a modification of a policy on the database, as described in further detail hereinbelow.

The device uses the data communicated by the policy data communicator 130, for determining whether access to an active wireless access point is allowable, as described in further detail hereinbelow.

In the example of the client application, the client application installed on the device uses the data to provide a user with indications on wireless access point allowability, prevent or restrict communication between the device and a wireless access point found to be not-allowable, etc., as described in further detail hereinbelow.

Optionally, the apparatus 1000 further includes a compliance data receiver (not shown).

The compliance data receiver receives data on compliance of the device with the policy selected for the device by the server computer (say by the policy selector 120), from the device.

The data on compliance of the device with the policy may include, for example, data on a deviation of the device from the policy (say by connecting to a wireless point that does not use any of the authentication protocols that the policy restricts to), data indicting that the device has not deviated from the policy, etc., as described in further detail hereinbelow.

Optionally, the apparatus 1000 further includes a resource access restrictor (not shown), in communication with compliance data receiver.

The resource access restrictor limits access of the device to enterprise computing resources such as data systems, databases, files, cloud services, etc., based on the compliance data received from the device.

The enterprise computing resources may include but are not limited to resources inside the organization˜s computer network(s) (say databases, computer servers, etc.), external resources (say the organization˜s Dropboxù Account, Microsoft⁺ Office 365 Account, etc., as known in the art), or both.

Optionally, the resource access restrictor limits the access to the enterprise computing resources, by issuing control commands to a DBMS (Database Management System) or an information system˜s user management module, based on the compliance data received from the device.

Optionally, the resource access restrictor limits the access to enterprise by issuing control commands to a DBMS (Database Management System) or to an information system˜s user management module, based on the compliance data received from the device.

Thus, in one example, the compliance data indicates the device˜s connection to a wireless access point that does not use any one of a few authentication protocols that the policy restricts to, or to a wireless access point not included in a white list defined by the policy, i.e. a deviation from the policy, as described in further detail hereinbelow.

In the example, upon receiving the data on the deviation from the policy, the resource access issues commands that revoke access rights of a user to whom the device belongs, to one or more enterprise computer resources (say databases, information systems, etc.), as described in further detail hereinbelow.

Optionally, the apparatus 1000 further includes a compliance data gatherer (not shown), in communication with the compliance data receiver.

The compliance data gatherer gathers data on user compliance with polices in one or more logs, say history data on policies selected for a specific device in use by the user over time, on a deviation of the device from the policy, on a sticking of the device to the selected policies, etc., as described in further detail hereinbelow.

Optionally, the compliance data gatherer is further operable by an administrator or another user (say the user of the device) if authorized, for viewing and analyzing the data gathered on user compliance, say using a dedicated GUI, using statistical software, etc., as known in the art.

Optionally, the apparatus 1000 further includes a policy definer (not shown), in communication with the database of policies.

The policy definer allows an administrator (or other operator) of the apparatus 1000 to define one or more policies, and assign the policy to a specific user group, to a specific user, to a specific device, to a specific device type, etc., as described in further detail hereinbelow.

Optionally, the apparatus 1000 further includes a database of access points, from which the policy definer allows the administrator to select access points for a white list or a black list with which the administrator defines the policy, say by selecting the access points one by one, as described in further detail hereinbelow.

Optionally, for each wireless access point represented in the database, the database holds data identifying the access point (say using SSID, name, etc.), geographical location data, owner name, an indication of the safety of the access points, etc. Optionally, the data held by the database is entered by an administrator, or rather by another user, as described in further detail hereinbelow.

Optionally, the policy definer further allows the administrator or other user to select one or more protocols for the policy, thereby defining protocols that an access point has to support in order for the access point to be found allowable according to the policy, as described in further detail hereinbelow.

Optionally, the apparatus 1000 further includes a policy modification initiator (not shown), in communication with compliance data receiver and the policy definer.

Upon receipt of certain data as predefined by an administrator or programmer of apparatus 1000, say data on the device˜s deviation from the policy assigned to the device, etc., one of the policies may need to be modified, a new policy may need to be defined, etc., as described in further detail hereinbelow.

To that end, the policy modification initiator may trigger a process aimed at modifying an existing policy or at defining a new policy, say using workflow software that initiates a workflow process in which the administrator is prompted (say using an email or pop-up message) to modify the existing policy or to define the new one.

In a first example, the pop-up message includes an hyperlink that when clicked by the administrator, opens a page of a GUI (Graphical User Interface) with which page the administrator can operate the policy definer, for defining the new policy or for modifying the existing policy, as described in further detail hereinbelow.

In a second example, the policy modification initiator triggers a semi-automatic process in which the pop-up message recommends a change (say an addition of an access point to one or more existing policies˜ black lists) to the administrator.

If the administrator approves the change, using the policy updater, the policy modification initiator modifies the existing polices according to the approved change, and the policy is updated in the database of policies, as described in further detail hereinbelow.

Whenever a policy recorded in the database as assigned to the device is modified, the policy data communicator 130 communicates data defining the modified policy to the device, say in a file or message, as described in further detail hereinbelow. The device uses the data for determining whether access to an active wireless access point is allowable, as described in further detail hereinbelow.

In one example, the policy modification initiator triggers a process of modifying a policy assigned to a device by removing a specific access point from a white list included in the assigned policy, whenever data received from the device indicates occurrence of a cyber attack that involves that access point.

Specifically, in the example, data on compliance of a device with a policy selected for the device is received by the compliance data receiver. The received data indicates an occurrence of a cyber attack based on a notorious computer virus in use by terror organizations while the device is connected to the access when the access point is still all according to the policy assigned to the device. As a result, the policy modification initiator triggers the process of modifying the policy, as described in further detail hereinabove.

In a second example, the policy modification initiator triggers the process of modifying the policy only when the notorious virus is detected by more than one hundred devices when the devices are connected to the same access point (though not necessarily simultaneously). Consequently, in the second example, one or more policies are modified by the process, as described in further detail hereinbelow.

Optionally, one or more the above described parts of apparatus 1000 is operable by an administrator of the apparatus 1000, using a GUI (Graphical User Interface) that implements management console functionality on the server computer, as described in further detail hereinbelow. Alternatively, the GUI may implement the management console functionality on another computer (say on the administrator's laptop computer, tablet, or smart phone), etc., as known in the art.

Figure 2:
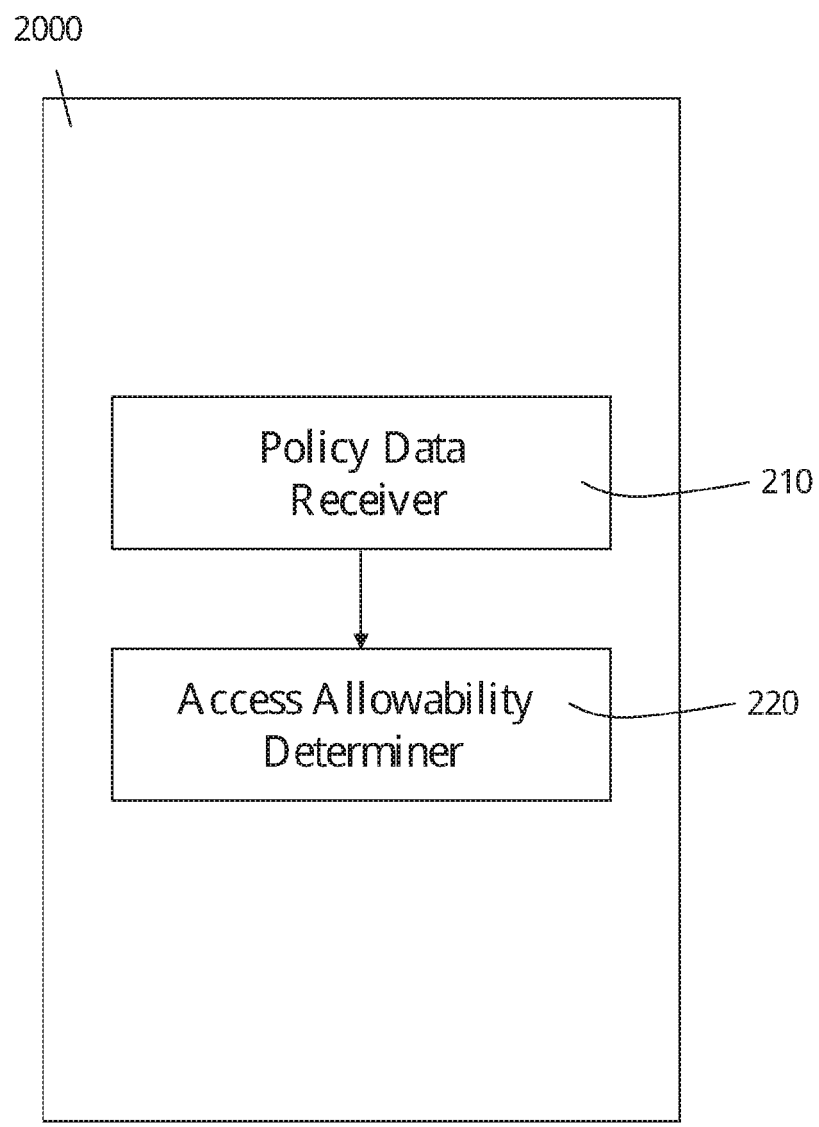
FIG. 2 is a simplified block diagram schematically illustrating a second exemplary apparatus for distributed wireless communications access security, according to an exemplary embodiment of the present invention.

Reference is now made to FIG. 2 which is a simplified block diagram schematically illustrating a second exemplary apparatus for distributed wireless communications access security, according to an exemplary embodiment of the present invention.

An apparatus 2000 for distributed wireless communications access security, according to one exemplary embodiment of the present invention, is implemented on a client device that is equipped with a computer processor and with other hardware and software components, as known in the art.

The client device also includes communications hardware and software components (say drivers and communications cards), for wireless communication to a wireless access point such as a Cellular Telephony Network's base station, etc., as described in further detail hereinbelow.

The client device may include but is not limited to: a smart mobile phone, a tablet computer, a laptop computer, a handheld POS device, a desktop computer, a controller, a telemetric device, a vehicle system, or any Internet of Things (IoT) device, etc., as known in the art.

Exemplary wireless access points that the client device may communicate with include, but are not limited to a Wi-Fi Access Point implemented on a Wi-Fi Router, a Cellular Network Base Station, a Femto-Cell Base Station, a standalone Bluetoothù communication device, etc., as known in the art.

The apparatus 2000 includes the client device's computer processor and one or more additional parts described in further detail hereinbelow, such as the parts denoted 210-220 in FIG. 2.

The additional parts may be implemented as software, say by programming the computer processor to execute steps of the methods described in further detail hereinbelow.

For example, one or more of parts 210-220 may be implemented as a client computer application such an iPhone⁺ App, which may be downloaded to the user's smart cellular phone (say an Apple⁺ iPhone or a Samsung⁺ Galaxy cellular phone) or tablet computer (say an Apple⁺ iPad), as known in the art.

The exemplary second apparatus 2000 further includes a policy data receiver 210 implemented on the computer processor of the client device, say as a part of the client application.

The policy data receiver 210 receives data that defines a policy selected by a server computer for the device from a database of policies using data characterizing the device, from the server computer (say from apparatus 1000), as described in further detail hereinbelow.

If data defining a policy previously selected by the server computer for the device exists on the device, the most recently received data defining the policy selected by the server computer for the device is used by the apparatus 2000 and any previous policy is discarded, marked and treated as expired, or simply ignored.

The policy received by the policy data receiver 210 defines a criterion for determining which access points are allowable. The policy may define the criterion using a white list of allowed access points, using a black list of forbidden access points, using a list of protocols that an access point has to implement in order to be allowable, etc., as described in further detail hereinabove.

The second apparatus 2000 further includes an access allowability determiner 220, in communication with the policy data receiver 210.

The access allowability determiner 220 monitors wireless communication signals received by the device, which signals may originate from one or more access points connected to the device, from one or more access points not connected to the device, etc., as described in further detail hereinbelow.

Based on that monitoring, the access allowability determiner 220 determines whether access to an active (i.e. a one that generates a signal received by the client device) wireless access point is allowable, using the received data defining the policy selected for the device, as described in further detail hereinbelow.

Optionally, the apparatus 2000 further includes an allowability status indicator in communication with the access allowability determiner 220.

For each one of at least some of the active access points, the allowability status indicator indicates an allowability status, to a user of the device, say using a specific GUI (Graphical User Interface) page presented to the user on a screen of the client device.

Optionally, the apparatus further includes a communication restrictor, in communication with the access allowability determiner 220.

The communication restrictor restricts communication between the device and one or more wireless active ones of the access points not determined to be all by the access allowability determiner 220.

Thus, in a first example, the access allowability determiner 220 determines for each one of one or more active wireless access points—i.e. access points the signals of which access points are received by the device—whether the access point is allowable.

In the first example, the access allowability determiner 220 determines whether the access point is allowable before the device even attempts to connect to the access point, as described in further detail hereinbelow.

Optionally, if the active access point is not determined to be allowable, the communication restrictor restricts the communication between the client device and the active wireless access point not determined to be allowable. For example, the communication may be restricted by blocking an attempt at establishing a connection between the device and the active access point not determined be allowable, as described in further detail hereinbelow.

In a second example, the access allowability determiner 220 determines whether an active wireless access point that the device attempts to establish a connection to is allowable, as the device attempts to establish a connection to that active access point.

Optionally, in the second example, if the active access point is not determined to be allowable, the communication restrictor restricts the communication between the client device and the active wireless access point not determined to be allowable. Optionally, the communication is restricted by stopping and blocking the device from establishing the connection, as described in further detail hereinbelow.

In a third example, the access allowability determiner 220 determines whether a wireless access point that the device is already connected to, is allowable. In the third example, a determination of the access points allowability is thus made after the connection between the device and the access point is established, as described in further detail hereinbelow.

Optionally, if the active access point is not determined to be allowable, the communication restrictor restricts the communication between the client device and the active wireless access point not determined to be allowable. For example, the application may disconnect the device from the active access point and block the device from re-establishing the connection between the device and the active access point, as described in further detail hereinbelow.

Optionally, the apparatus 2000 further includes a compliance data communicator, in communication with the access allowability determiner 220.

The compliance data communicator communicates data on compliance of the device with the policy selected for the device to the server computer, say data on a deviation of the device from the policy selected for the device, or rather data that indicates that no deviation of the device from the policy has occurred in a recent time period of say one hour, as described in further detail hereinbelow.

Optionally, the compliance data communicator may additionally or alternatively, send data on the compliance (say on the deviation from the policy) to a computer other than the server computer, say to computer that hosts a Dropboxù Account, a Microsoft÷ Office 365 Account, etc.

Figure 3A:
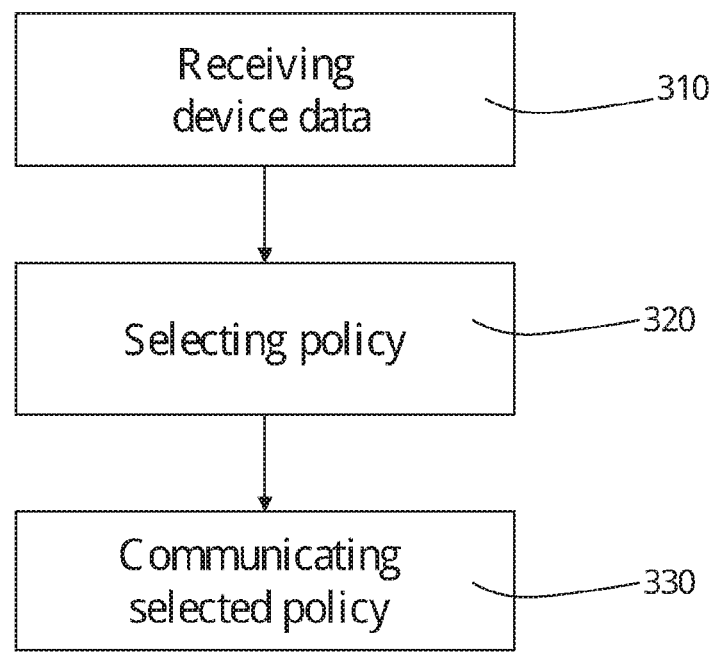
FIG. 3A is a simplified flowchart schematically illustrating a first exemplary method of distributed wireless communications access security, according to an exemplary embodiment of the present invention.

Reference is now made to FIG. 3A which is a simplified flowchart schematically illustrating a first exemplary method of distributed wireless communications access security, according to an exemplary embodiment of the present invention.

A first exemplary method of distributed wireless communications access security, according to an exemplary embodiment of the present invention, may be executed by a computer processor of a server computer (say by an enterprise computer server), as described in further detail hereinabove.

The exemplary method includes one or more steps that a computer processor of the server computer is programmed to perform, as described in further detail hereinbelow.

When carrying out the method, the server computer may communicate with client devices such as a smart mobile phone, a tablet computer, a laptop computer, etc., say with a client application which runs on a client device, as described in further detail hereinabove.

In the method, there is received 310 data characterizing a device, say by the device data receiver 110 of apparatus 1000, as described in further detail hereinabove.

The device may include, but is not limited to any device used for wireless communications.

For example, the device may include, but is not limited to a mobile phone, a terminal, a laptop computer, a handheld Point-of-Sale (POS) terminal, a tablet computer, a desktop computer, a remote utilities telemetric device, a vehicle device (say a car˜s infotainment system or electric control unit), etc., as known in the art.

The device may additionally or alternatively include any device that can connect to a communications network such as the internet, which devices are very often referred to today as: Internet-of-Things (IOT) devices˜.

The data characterizing the device may be received 310 from the device itself, from an administrator (say an administrator of apparatus 1000), from a database or file that holds information on devices in use by enterprise employees and that maps the employees (and hence the devices) to user groups, etc., as described in further detail hereinbelow.

The data characterizing the device may include, but is not limited to: the device˜s type (say a Point-of-Sale terminal vs. a smart phone vs. a laptop computer), data on whether the device belongs to the organization or on user group(s) that the user of the device belongs to, the device˜s location, etc., as described in further detail hereinbelow.

Next there is selected 320 a policy from a database of policies, using the received 310 data characterizing the device, for the device, say by the policy selector 120, as described in further detail hereinabove.

The policy defines a criterion for determining which wireless access points are allowable.

The policy may define the criterion using an allowable access points list (i.e. a white list), a non-allowable access points list (i.e. a black list), an indication on protocol(s) that an access point has to implement (say for authentication, encryption, etc.) in order to be allowable, etc., or any combination thereof, as described in further detail hereinbelow.

Optionally, the policy pertains to a specific one or more stage of communication with an active (i.e. a one that generates a signal received by a client device) wireless access point.

For example, the policy may pertain to a stage of establishing a connection with the access point, to a stage of communicating with the access point over the established connection, or rather to a stage in which the device receives the access point signal but is neither connected nor trying to connect to access point, etc.

In one example, the database of the policies is a relational database, as known in the art.

In the example, each policy is represented in the relational database as a set of related database tables, and is associated with a key (i.e. a combination of field values) that defines the circumstances under which the policy applies, according to which key the policy may be selected 320 for the device.

The circumstances may include, but are not limited to the device type, to whether the device belongs to the company operating the server computer, to the device˜s location, to time, to organizational data that pertains to a user of device, etc., as described in further detail hereinbelow.

Thus, in one example, one policy is associated with a key that indicates that the policy applies only if the device is a mobile phone, whereas a second policy is associated with a key that indicates that the policy applies only if the device is a desktop computer that belongs to the company and is out of the company's offices.

Optionally, the selection 320 of the policy for the device is further based on organizational data that pertains to a user of device.

For example, the policy may be associated with a key that indicates that the policy applies only if the device is a mobile device (as apposed to a desktop computer) and is assigned (say in the database) to a user who is assigned (say in that database) to a specific user groups, as described in further detail hereinbelow.

After selecting 320 the policy, data defining the selected 320 policy is communicated 330 to the device, say by the policy data communicator 130, as described in further detail hereinabove.

The device (say the client application installed on the device) uses the communicated 330 data for determining whether access to an active wireless access point is allowable, as described in further detail hereinbelow.

Optionally, the data defining the selected 320 policy is communicated 330 to the device as a file or as a message that holds relevant data copied from the above mentioned relational database tables that represent the policy, say to a client application installed on the device, as described in further detail hereinbelow.

In the example of the client application, the client application receives the data defining the selected 320 policy, and uses the data to provide a user with indications on wireless access point allowability. The client application further restricts communication between the device and a wireless access point not determined to be allowable based on the received data, etc., as described in further detail hereinbelow.

Optionally in the method, there is later received data on compliance of the device with the policy selected 320 for the device from the device, say using the compliance data receiver of apparatus 1000. The data on the compliance of the device may include data on a deviation of the device from the policy selected 320 for the device, on a sticking of the device to the policies, etc., as described in further detail hereinabove.

In one example, the data on the compliance is data on a deviation of the device from the policy selected 320 for the device by the server computer, say on a deviation by the device's connecting to a wireless access point not allowed by the policy selected 320 for the device, as described in further detail hereinabove.

Optionally, in the example, upon receipt of the data on the deviation, there is restricted access of a user of the device to at least one system resource based on the deviation, say by the resource access restrictor of apparatus 1000, as described in further detail hereinabove.

The enterprise computing resources may include, but are not limited to computing resources such as data systems, databases, files, cloud services, etc., as known in the art.

The enterprise computing resources may include but are not limited to resources inside the organization's computer network(s) (say databases, computer servers, etc.), external resources (say the organization's Dropboxù, Microsoft⁺ Office 365 or other cloud service account, etc., as known in the art), or both.

Optionally, the access is restricted by issuing control commands to a DBMS (Database Management System) or to an information system's user management module, based on the compliance data received from the device, as described in further detail hereinbelow.

Thus, in one example, the compliance data indicates the device's connecting to a wireless access point that does not use any one of a few authentication protocols that the policy restricts to, or to a wireless access point not included in a white list defined by the policy, i.e. on a deviation from the policy.

Optionally, upon receiving the data on the deviation, there are issued one or more commands that revoke access rights of the device (or of a user to whom the device is assigned, say in a database) to one or more enterprise computer resources (say databases, information systems, etc.), as described in further detail hereinbelow.

Optionally, when there is later received data on positive compliance of the device with the policy selected 320 for device (say on the device's switching to an access point allowed by the selected 320 policy), there is issued one or more commands with which the revoked access rights are returned to the user, as described in further detail hereinabove.

Optionally, upon receipt of the data on the deviation, there is prompted an update of the policy deviated from based the deviation, say by the policy modification initiator, as described in further detail hereinabove.

Optionally, for that prompting, there is triggered a process aimed at modifying the policy, say using a workflow module that initiates a workflow process in which an administrator of the apparatus 1000 has to choose between allowing and rejecting a proposed modification of the policy deviated from.

For example, the administrator may be asked via an automatically generated email message, to allow an extension of a list of allowable access points (i.e. white list) defined by the policy, so as to include the wireless access point connected to by the device though not allowed by the policy selected 320 for the device.

In the example, when the administrator clicks on a button included in the message, the policy is updated accordingly, say by updating one or more of the relational database tables representing the policy in the relational database, say by extending a white list of access points, as described in further detail hereinabove.

Optionally, in one case of the example, the prompting is conditioned upon receiving data on a deviation that involves a same access point from a number of devices, say from one hundred devices over a time period of twenty four hours without detection of a cyber attack against any of those devices (say per a setting of the number and time period by an administrator of apparatus 1000).

Thus, in that case of the example, a policy is selected 320 for each respective one of several devices, and data received from each specific one of at least one hundred of the devices indicates that the specific device deviates from the policy selected 320 for the specific device.

However, in that case, the deviations of the at least one hundred devices involve the same wireless access point. Accordingly, in that case, the prompting allows the administrator to have one or more of the policies selected 320 for the devices updated based on those deviations, say for making that same access point allowable, as described in further detail hereinbelow.

Optionally, the exemplary method further includes gathering data on user compliance with polices in one or more logs, say data on the deviation of a device assigned to the user from the policy selected 320 for the device, or on sticking of the user to the policy, say by the compliance data gatherer, as described in further detail hereinabove.

Optionally, at least some of the gathered data is forwarded to one or more information systems internal to a computer network of the organization that operates the server computer, to information systems external to the organization (say to the organization˜s Dropboxù account), etc., as described in further detail hereinabove.

Optionally, the exemplary method further includes one or more preliminary steps of defining the policies and storing the defined policies in the database.

Thus in some examples, an administrator of apparatus 1000 uses a GUI (Graphical User Interface) implementing management console functionality on the server computer or on a computer in communication the server computer, for defining one or more of the policies, as described in further detail hereinbelow.

Reference is now made to 3B which is a simplified diagram illustrating a first exemplary page of an exemplary GUI of an apparatus for distributed wireless communications access security, according to an exemplary embodiment of the present invention.

Using the policies defined using the exemplary GUI, the administrator may be able to specify which access points are allowable, which access points are not allowable or are not recommended to communicate with, etc., and under what circumstances each of the policies applies, as described in further detail hereinbelow.

Figure 3B:
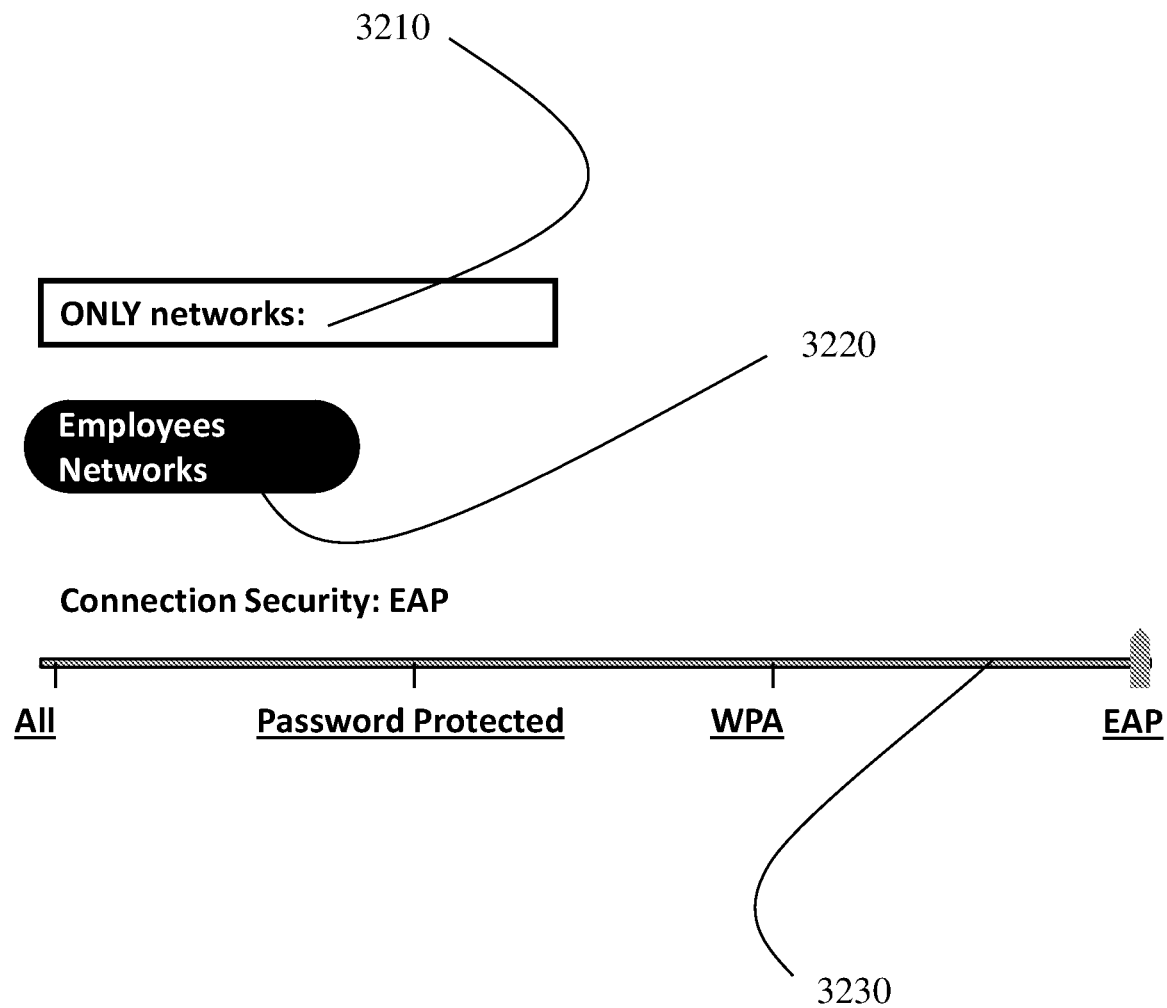
FIG. 3B is a simplified diagram illustrating a first exemplary page of an exemplary GUI of an apparatus for distributed wireless communications access security, according to an exemplary embodiment of the present invention.

In an exemplary GUI page illustrated in FIG. 3B, the administrator is allowed to define a new policy or rather update an existing policy.

For example, the administrator may define or edit a policy, say by defining one or more policy conditions, as shown in the exemplary GUI page of FIG. 3B.

Specifically, with the exemplary GUI, the administrator defines a policy condition by choosing between a logical condition term such as: All networks except:˜ and a logical condition term such as: Only networks:˜ 3210. The chosen term specifies whether access points listed in the policy make up a white list of allowable access points or rather, a black list of non-allowable access points, respectively.

Then, the administrator selects one or more access points to occupy the white list or black list as per the logical condition term chosen by the administrator.

Optionally, the access points are selected by the administrator one by one, say from a database of wireless access points.

For each wireless access point represented in the database, the database holds data identifying the access point (say SSID, name, etc.), geographical location data, owner name, an indication on the safety of the access point, etc. Optionally, the data held by the database is entered by an administrator, or rather by another user, as described in further detail hereinabove.

Alternatively or additionally, in the database, at least one group of the access points is assigned to a respective category, and the database further holds the categories of access points. The categories may be based on geographical location, security, access point type (say cellular base stations vs. hotspots), etc.

Accordingly, the administrator may select one or more of the categories for the black list or the white list, say an exemplary category entitled: employees networks˜ 3220, as shown in FIG. 3B.

The exemplary: employees networks˜ category includes access points assigned to that exemplary category in the database, say wireless access points that an organization that uses apparatus 1000 to protect its computing resources, wishes to open for access by all devices assigned to the organization˜s employees.

Alternatively, the administrator may also choose a logical condition term such as: all networks˜ (thus making all access points allowable according to that policy condition) or rather a logical condition term such as: No network˜ (thus making all access points non-allowable according to the policy condition).

Alternatively or additionally, the administrator may define a policy condition by choosing a logical condition term such as: Only networks with:˜ say for conditioning wireless access point allowability upon protocols supported by the wireless access point.

The administrator may selects the protocol(s) that an access point needs to support in order to be allowable, say one or more authentication protocols, one or more encryption protocol, etc. or any combination thereof.

In one example, a selection of the authentication protocols is carried out using an elongated GUI control element 3230 with which the administrator can choose among protocols such as EAP (Extensible Authentication Protocol), WPA (Wi-Fi Protected Access), Password Protected, etc. Optionally, when the administrator chooses a weaker or a more general protocol such as: Password Protected˜, stronger or more specific protocols that appear on the elongated GUI control element 3230 (say WPA) are automatically selected with the weaker or more general protocol.

Optionally, the administrator is also allowed to select a Boolean relation to be applied on the defined policy conditions, say an 'AND_, an 'OR_, or rather a 'XOR_.

Thus in one example, the administrator chooses an 'AND_ relation and accordingly, in order for an access point to be found allowable, all policy conditions defined for the policy need to allow that access point. Alternatively, the relation to be applied on the defined policy conditions is fixed (say always an 'AND_ or always an 'OR_), as predefined say by an administrator or computer programmer of apparatus 1000.

Figure 3C:
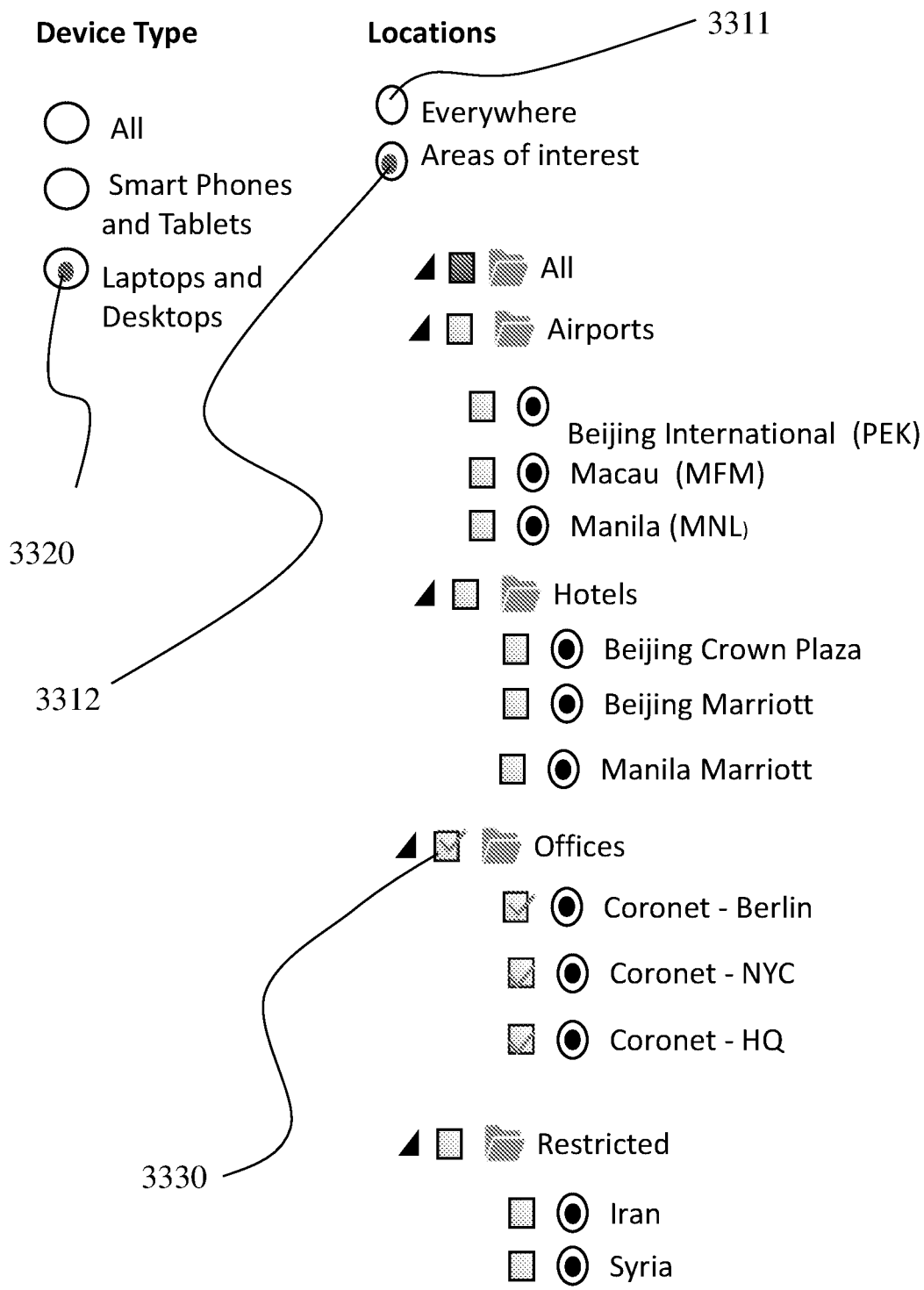
FIG. 3C is a simplified diagram illustrating a second exemplary page of an exemplary GUI of an apparatus for distributed wireless communications access security, according to an exemplary embodiment of the present invention.

Reference is now made to FIG. 3C which is a simplified diagram illustrating a second exemplary page of an exemplary GUI of an apparatus for distributed wireless communications access security, according to an exemplary embodiment of the present invention.

As a part of defining the policy, the administrator further specifies the circumstances under which the policy applies, which specified circumstances may be implemented, for example, as a key of at least one of a group of relational database tables that represent the policy, as described in further detail hereinabove.

For example, using an exemplary GUI page as illustrated in FIG. 3C, the administrator may choose the device type(s) that the policy applies to, say whether the policy applies to smart phones and tablet computers, laptop and desktop computers, Windows⁺ devices vs. Android Devices, etc., or rather to all devices.

Thus, for example, the administrator may use a GUI control element such as FIG. 3C˜s leftmost radio button that bears the: Device Type˜ caption, to choose the device type(s) that the policy applies to, thereby specifying at least in part, the circumstances under which the policy applies.

With FIG. 3C˜s exemplary GUI page, the administrator may also choose the device location that the policy applies to, say using a hierarchical GUI control element such as FIG. 3C˜s rightmost radio button bearing the: Location˜ caption.

With the exemplary GUI, the administrator may choose the: Everywhere˜ 3311 option, thus defining the policy to be a one that is not restricted to any device location, or rather choose the: Area of Interest (AOI)˜ 3312 option and select the location among Areas of Interest presented using the hierarchically arranged radio buttons of the GUI.

The hierarchical GUI control element may arrange the Areas of Interest according to geographical location, AOI types, AOI statuses (say a one of areas under alert), etc., or any combination thereof. Thus, the hierarchical GUI control element allows the administrator to select the Areas of Interest according to geographical location, AOI type, AOI status, etc., as described in further detail hereinbelow.

Thus, in one example, the administrator may define that the policy applies only to laptop and desktop computers 3320, and that the computers also have to be present within an organization˜s specific offices, as in the case of the example˜s Coronet LTD˜s Office selection 3330 shown in FIG. 3C.

In a second example, the selection of the Areas of Interest made using the hierarchical GUI control element, is rather a one of a geographical area, say: Cuba˜ or rather a group of geographical areas currently under an alert condition as may be predefined, for example, by an administrator of apparatus 1000, as described in further detail hereinbelow.

Optionally, the administrator is further allowed to define the circumstances under which the policy applies with respect to time (say day hours, day of week, etc.), a stage of connection to an access point, etc., say using additional GUI pages, GUI control elements, etc., as described in further detail hereinbelow.

With the exemplary GUI, each location present in the hierarchy of Areas of Interest may be defined in advance, using one or more other pages of the exemplary GUI, and mapped to the hierarchy based on geographical location, AOI type, AOI status, etc., as described in further detail hereinbelow.

Figure 3D:
FIG. 3D is a simplified diagram illustrating a third exemplary page of an exemplary GUI of an apparatus for distributed wireless communications access security, according to an exemplary embodiment of the present invention.

Reference is thus made to FIG. 3D which is a simplified diagram illustrating a third exemplary page of an exemplary GUI of an apparatus for distributed wireless communications access security, according to an exemplary embodiment of the present invention.

With the exemplary GUI, the administrator may define an Area of Interest, say by selecting an area 3410 by drawing a round borderline on an interactive map presented to the administrator (say on an interactive map similar to the maps presented with Googleù Maps, as known in the art).

Then, the administrator may name the area and assign the area into a place in the hierarchical GUI control element. Thus, in the example of FIG. 3D, an area 3410 selected on an interactive map, is named: San Francisco Airport˜ 3421, and assigned to the hierarchical GUI control element, under an: Airports˜ category 3422.

By positioning the: San Francisco Airport˜ area˜s name 3421 under the: Airports˜ category 3422, and thereby assigning the area to the: Airports˜ category 3422, the administrator further allows a group selection of that area and other areas (say the: Singapore Airport˜ 3423 of the example), when defining a policy. Thus, when defining the policy, a selection of all areas assigned to the: Airports˜ category 3422, using the hierarchical GUI control element, would require clicking on the: Airports˜ category 3422 only.

Optionally, the hierarchical GUI control element further allows a selected area to rather be an area that the policy being defined does not apply to, say when the administrator places the area under a special category (not shown) of excluded areas.

Figure 3E:
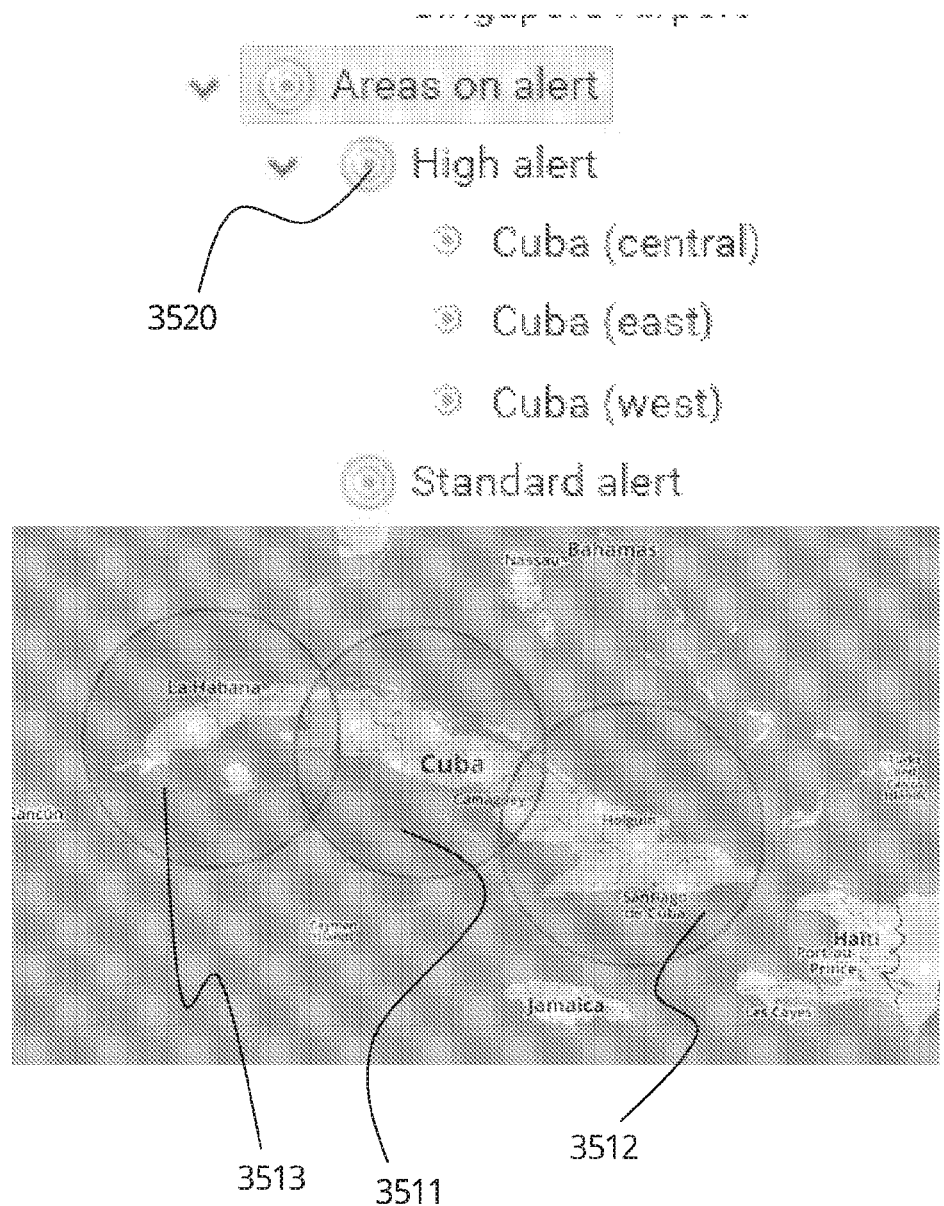
FIG. 3E is a simplified diagram illustrating a fourth exemplary page of an exemplary GUI of an apparatus for distributed wireless communications access security, according to an exemplary embodiment of the present invention.

Reference is now made to FIG. 3E which is a simplified diagram illustrating a fourth exemplary page of an exemplary GUI of an apparatus for distributed wireless communications access security, according to an exemplary embodiment of the present invention.

With the exemplary GUI, the administrator may define one or more Areas of Interest, say by selecting the areas 3511-3513 by drawing round or rectangular borderlines on the interactive map.

In the example of FIG. 3E, the administrator further names the areas 3511, 3512, 3513, :Cuba (center)˜, :Cuba (east)˜, and :Cuba (west)˜, respectively.

In the example of FIG. 3E, the administrator further assigns the areas 3511-3513 to the hierarchical GUI control element, under a: High Alert˜ category 3520.

By positioning the areas 3511˜3513˜s names under the: High Alert˜ category 3520, and thereby assigning the areas to the: High Alert˜ category 3520, the administrator further allows a group selection of area 3511˜3513 and other areas when defining a policy. As a result, when defining the policy, a selection of all areas assigned to the: High Alert˜ category 3520, using the hierarchical GUI control element, would require clicking on the: High Alert˜ category 3520 only.

Figure 3F:
FIG. 3F is a simplified diagram illustrating a fifth exemplary page of an exemplary GUI of an apparatus for distributed wireless communications access security, according to an exemplary embodiment of the present invention.

Reference is thus made to FIG. 3F which is a simplified diagram illustrating a fifth exemplary page of an exemplary GUI of an apparatus for distributed wireless communications access security, according to an exemplary embodiment of the present invention.

Optionally, with the exemplary GUI, the administrator may define an Area of Interest by selecting an area 3610, by drawing a borderline around the area as presented to the administrator on an interactive map. The borderline may have a polygonal (say rectangular) shape or any other shape, Then, the administrator may name the area and assign the area into a place in the hierarchical GUI control element. Thus, in the example of FIG. 3F, the area 3610 selected on the interactive map is named: Atlanta, Ga., USA˜ and assigned to the hierarchical GUI control element, under a: Cities˜ category 3620.

By positioning the: Atlanta, Ga., USA˜ area name 3610 under the: Cities˜ category 3620, and thereby assigning the area to the: Cities˜ category 3620, the administrator further allows a group selection of the area 3610 together with other areas when defining a policy. As a result, when defining the policy, a selection of all areas assigned to the: Cities˜ category 3620, using the hierarchical GUI control element, would require clicking on the: Cities˜ category 3620 only.

Optionally, at least a part of the hierarchical GUI control element with Areas of Interest, categories, etc., is populated automatically using a utility application that retrieves areas, categories, etc., say from a service such as Googleù Maps or from a database, and adds the areas and categories to the hierarchical GUI control element.

With the exemplary GUI, an administrator of the apparatus 1000 may be allowed to associate one or more device(s) to a user, and to assign a policy to a specific device, to a specific user (and thus to all devices assigned to the user), or rather to a group of users (say a one of field technicians, high management, etc).

Optionally, the administrator may further be allowed to define a default policy applicable to any device to which no other policy applies, as described in further detail hereinbelow.

Reference is thus made to FIG. 3G which is a simplified diagram illustrating a sixth page of an exemplary GUI of an exemplary apparatus for distributed wireless communications access security, according to an exemplary embodiment of the present invention.

In an example illustrated in FIG. 3G, one of the GUI pages is a table-like status page 3700 that identifies each user using the user˜s e-mail address in the first column, indicates activity of the user˜s device(s) in the second column, and identifies the policy assigned to the user and a basis for assigning the policy in the last two columns.

Thus in the example, in the third line presented on the status page, a user is identified using his: Kim@A B27.co.uk˜ e-mail address in the leftmost column, and the page indicates that one of the three devices assigned to that user is active (see: 1/3˜ in the second column). The status page further presents the policy assigned to the user (that is: Policy 2˜) in the third column and the basis for that policy˜s assigning (that is the user˜s belonging to the: IT˜ users group) in the last, rightmost column.

Further in the example, in the fourth line presented on the status page, a user is identified using his: Dan@A B27.co.uk˜˜ e-mail address in the leftmost column, and the page indicates that none of the three devices assigned to that user is active (see: 0/3˜ in the second column). The status page further presents the policy assigned to the user (that is: Policy 1˜) in the third column and the basis for that policy˜s assigning (that is a user specific assignment) in the last, rightmost column.

Figure 3H:
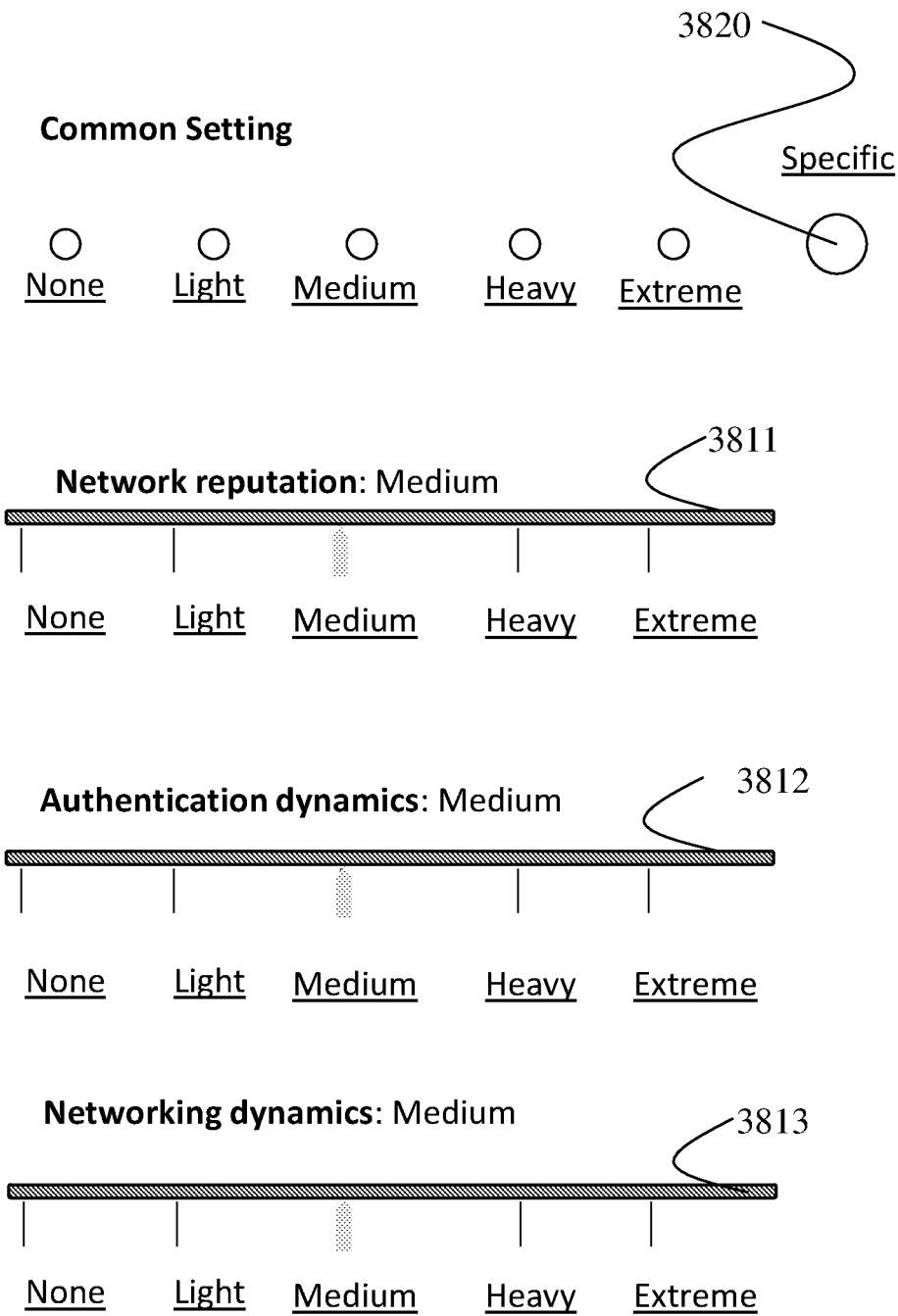
FIG. 3H which a simplified diagram illustrating a seventh exemplary page of an exemplary GUI of an apparatus for distributed wireless communications access security, according to an exemplary embodiment of the present invention.

Reference is now made to FIG. 3H which is a simplified diagram illustrating a seventh exemplary page of an exemplary GUI of an apparatus for distributed wireless communications access security, according to an exemplary embodiment of the present invention.

Optionally, for each policy there may be defined a set of checks that a device assigned the policy needs to carry out for determining whether an access point is allowable, say using the client application, as described in further detail hereinabove.

Optionally, the checks are based on one or more functions implemented by the client application˜s code. Each of the functions may return a binary result (Say: 0˜ or: 1:˜), a score (one to ten), etc., as known in the art.

In one example, for each one of three general stages of communication with access points the signals of which are received by the device, there is selected one level among five level, using a specific GUI control element 3811-3813, as illustrated in FIG. 3H.

In the example, the set of checks carried out during each specific stage and the weighting among the checks carried out during the stage are determined automatically based on the level selected for the stage.

Indeed, some wireless security risks can only be assessed indirectly, using different pieces of evidence. Accordingly, a determination of access point allowability may be better based on a weighting among two or more checks, which weighting may represent both the likelihood of a risk˜s presence and the potential damage that that risk poses to computer resources.

The checks may pretend, for example, to IP (Internet Protocol) spoofing detection, to deviations from standard protocol rules, to rogue networks pertaining to be a part of a network that the device connects using the access point, etc., as known in the art.

In the example, the five levels are: None˜ (which means that none of the function implemented checks should be used), :Light˜, :Medium˜, :Heavy˜, and:Extreme˜, as illustrated in FIG. 3H.

In the example illustrated using FIG. 3H, the administrator may choose a specific level for each one of the three stages, by selecting the round checkbox 3820 bearing the: Specific˜ caption, and selecting a specific level for each one of the three stages, using the GUI control element 3811-3813 that is specific to that stage.

Specifically, in one case, the administrator chooses a specific level of checks to be applied on access points (say wireless networks) that the device receives their signals before even trying to establish a connection to any specific one of the access points, using a specific GUI control element 3811. The checks performed before even trying to establish the connection may also be referred to as 'network reputation checks_.

In that case of the example, the administrator further chooses a specific level of checks to be applied on an access point when the device tries to establish a connection to the specific access point, using a specific GUI control element 3812.

Further in the example, the administrator chooses a specific level of checks to be applied on an access point when the device communicates with the access points over an established connection, using a specific GUI control element 3813.

Alternatively, in the example, the administrator may choose a common level for all three stages, by selecting one of the round checkboxes arranged to the left of the bigger checkbox 3820 that bears the: Specific˜ caption, and leaving the bigger checkbox 3820 empty.

Figure 3I:
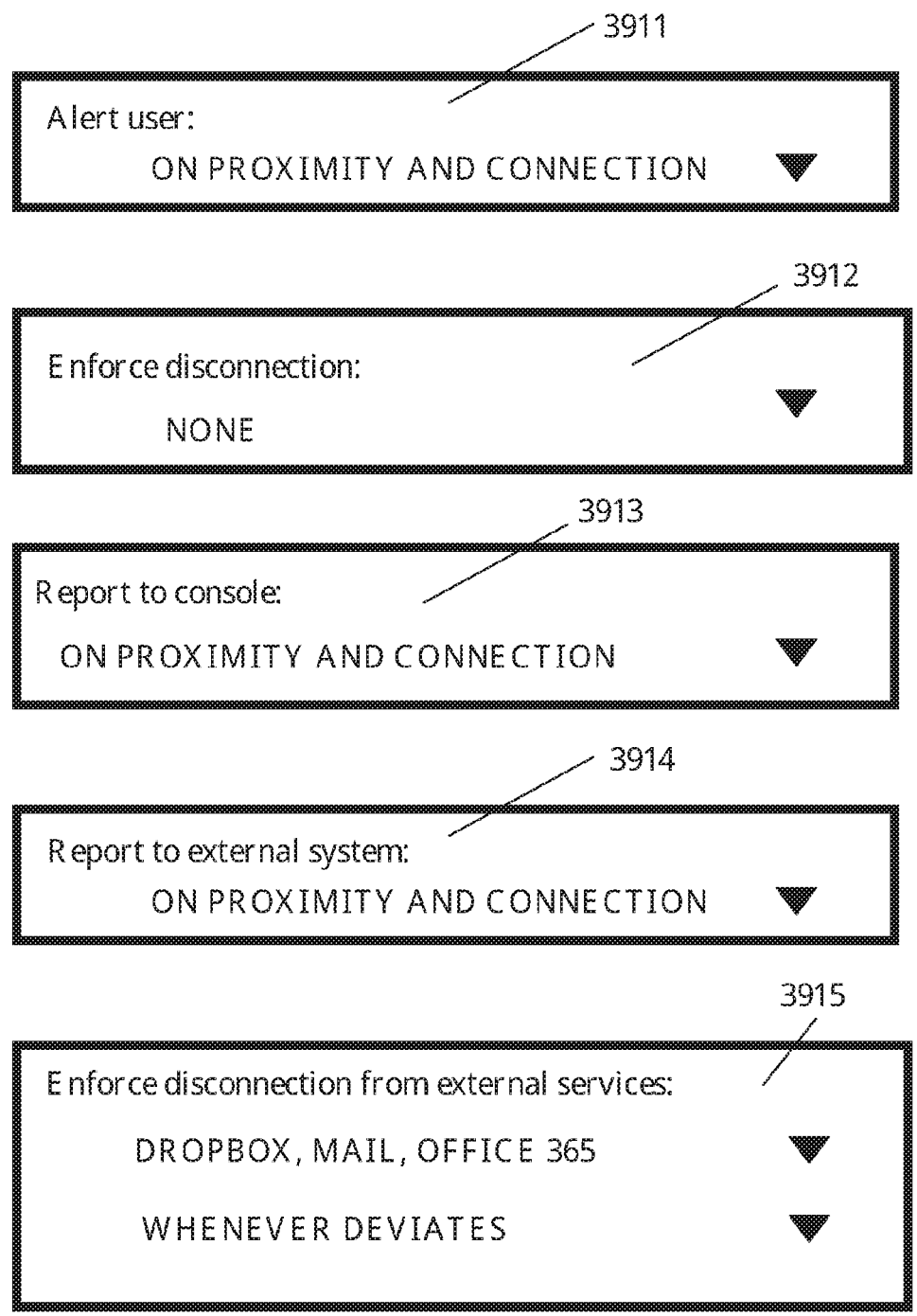
FIG. 3I is a simplified diagram illustrating an eighth exemplary page of an exemplary GUI of an apparatus for distributed wireless communications access security, according to an exemplary embodiment of the present invention.

Reference is now made to FIG. 3I which a simplified diagram illustrating an eighth exemplary page of an exemplary GUI of an exemplary apparatus for distributed wireless communications access security, according to an exemplary embodiment of the present invention.

Optionally, with an exemplary page of GUI illustrated in FIG. 3I, as a part of defining the policy, the administrator may also define what enforcement actions the apparatus 1000 (say client application) is to perform, among a predefined (say by a programmer of apparatus 1000) set of actions, and select a condition for each action˜s performance.

Thus, for example, the administrator may define that an action of alerting the user 3911 (say using a pop-up message or by specific tone), is to be performed by the client application when the device is in proximity to a non-allowable access point, is trying to connect to the non-allowable access point, or is connected thereto.

Alternatively, the administrator may define that the alerting action 3911 is to be performed only when the application recognizes an attack, only when the application recognizes an attack or a suspicious activity, etc., or rather that the client application should never perform the alerting action 3911.

Similarly, in the example, the administrator may define that an action of enforcing a disconnection of the device from the access point 3912 is to be performed by the client application when the device is in proximity to a non-allowable access point, is trying to connect to a non-allowable access point, or is connected thereto.

Alternatively, the administrator may define that the disconnection action 3912 is to be performed only when the application recognizes an attack, only when the application recognizes an attack or a suspicious activity, etc., or rather that the client application should never perform the disconnection action 3912.

The administrator may also define that an action of reporting 3913 to an application that implements manager console functionality on the server computer (or on another computer), is to be performed by the client application when the device tries to connect to a non-allowable access point, or is connected thereto. In one example, the action of reporting 3913 is carried out by sending an e-mail message over the Internet, using an SMS (Short Messages Services) message, etc., as known in the art.

Alternatively, the administrator may define that the reporting action 3913 is to be performed only when the application recognizes an attack, only when the application recognizes an attack or a suspicious activity, upon occurrence of any one of those events, or rather never.

Further in the example, the administrator may define that an action of reporting 3914 to an external Security Information and Event Management (SIEM) system as known in the art, is to be performed upon occurrence of certain events, when the device is in communication with an allowed access point, never, always, etc.

In the example, the administrator may define what information is to be reported in that external reporting action 3914, say only information on being attacked, information on suspicious network activity, etc., or any combination thereof.

Further in the example, the administrator may define that an action of disconnecting 3915 of the device from one or more external computer resource (say from Dropboxù, Microsoft⁺ Office 365, or other cloud service), is to be performed, say whenever the device deviates from the policy assigned to the device.

Figure 3J:
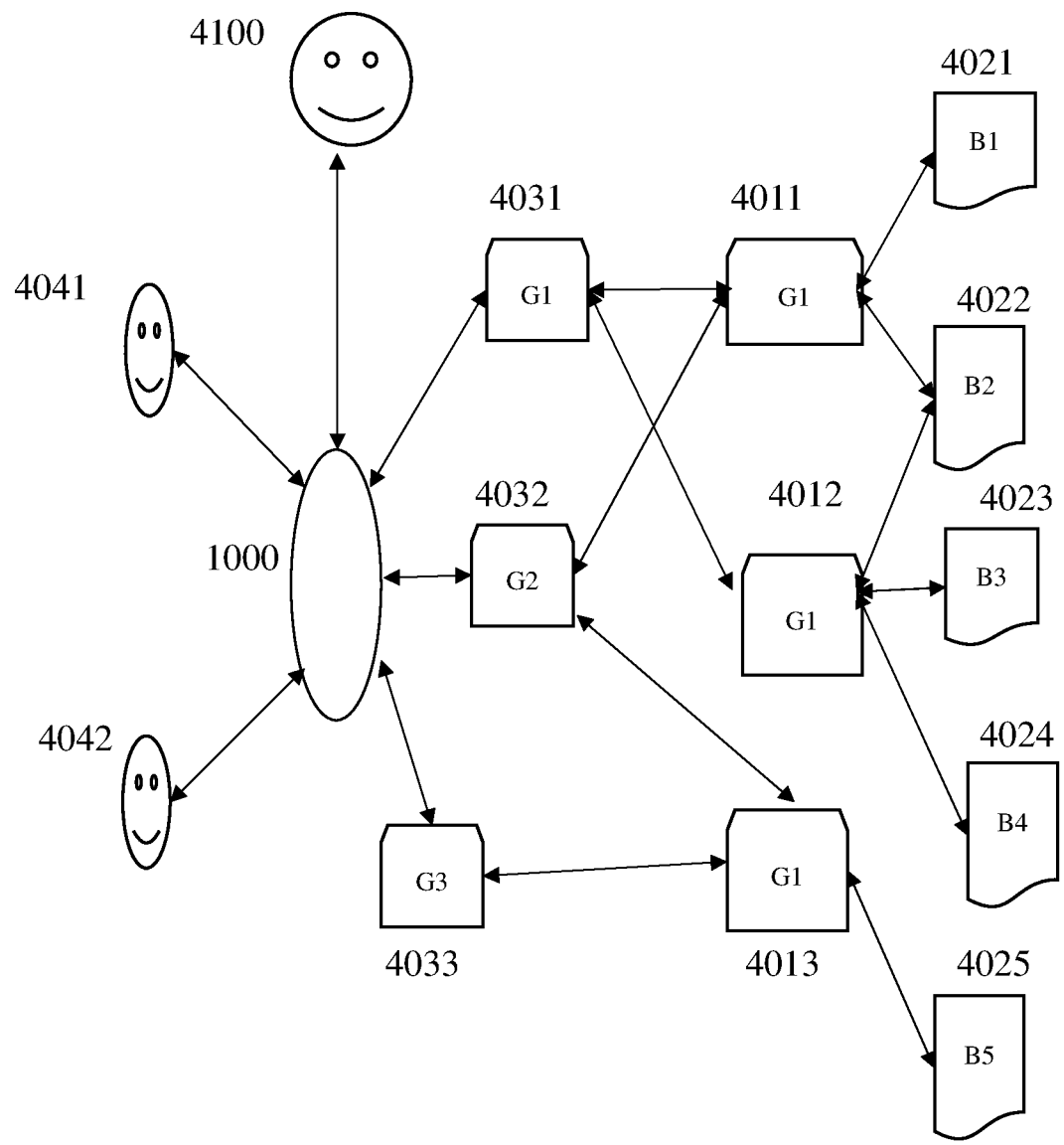
FIG. 3J is a simplified diagram illustrating a first exemplary policy conflict resolving scenario, according to an exemplary embodiment of the present invention.

Reference is now made to FIG. 3J which is a simplified diagram illustrating a first exemplary policy conflict resolving scenario, according to an exemplary embodiment of the present invention.

Optionally, the exemplary method includes one or more preliminary steps of defining one or more policies, as described in further detail hereinabove.

Optionally, one or more 4011-4013 of the policies may be defined based on one or more previously defined policies 4021-4025.

The policies 4011-4013 that are defined based on previously defined polices 4021-2025 are also referred to hereinbelow as: super-policiesˇ. The policies 4021-2025 used to define the super-policies 4011-4013 are also referred to hereinbelow as: behaviorsˇ within a super-policy 4021-4025.

In the example, each one of policies 4021-4025 may be assigned to one or more super-policies 4011-4013, and each super-policy 4011-4013 may be assigned one or more of polices 4021-4025, i.e. an M:N relationship, as known in the art.

However, different policies (i.e. behaviors) assigned to a same policy may include conflicting rules.

In one example, a first behavior 4021 assigned to super-policy 4011, conditions access point allowability upon the access pointˇs implementing the EAP authentication protocol. However, a second behavior 4022 assigned to that super-policy 4011 allows any password based authentication protocol. A conflict between the two policies (i.e. behaviors) 4021, 4022 assigned to the same super-policy 4011 therefore needs to be resolved.

Optionally, the conflict is resolved according to one or policy conflict resolution rules, as predefined by a programmer or administrator 4100 of apparatus 1000. Additionally or alternatively, the conflict is resolved manually, say by the administrator 4100.

Thus, optionally, in the example, the conflict is resolved based on a restrictive rule, say a one that dictates an overriding of the second behaviorˇs 4022 rule that allows any password based authentication protocol with the first behaviorˇs 4021 rule that conditions access point allowability upon the access pointˇs implementing EAP.

Alternatively, in the example, the conflict is rather resolved based on a rule that dictates an overriding of the first behaviorˇs 4021 rule that conditions access point allowability upon the access points implementing EAP, with the second behaviorˇs 4022 rule that allows any password based authentication protocol.

Alternatively, in the example, the conflict is rather resolved based on a time of policy (i.e. behavior 4021-4025) assignment, such that in case of a conflict between two or more behaviors assigned to a common super-policy, the policy assigned more recently prevails.

Optionally, when the conflict is identified, say by the policy definer of apparatus 1000, the administrator 4100 is alerted on the conflict and is asked to solve the conflict, say by choosing among the policies (such that only one policy ends up in the super-policy) or rather among conflicting rules of the policies.

Similarly to policies that are not based on other policies, the conflict-resolved super-policies may be stored in the database of policies, as described in further detail hereinabove.

In the example, each one of the super-policies 4011-4013 may be assigned to one or more user groups 4031-4033, and each one of the user groups 4031-4033 may be assigned one or more super-policies, i.e. an M:N relationship, as known in the art.

Further in the example, each one of the user groups 4031-4033 may be assigned (say by the administrator 4100) one or more users 4041-4042 and each one of the users 4041-4042 may be assigned to one or more user groups 4031-4033, as described in further detail hereinbelow.

It is noted that although not illustrate in FIG. 3J, a user group may also be assigned a policy not defined based on previously defined policies, directly, say one of the policies 4021-4025 that when being used to define a super-policy 4011-4013, is also referred to hereinabove as a: behaviorˇ.

However, different policies assigned to a same user group may conflict, as described in further detail hereinabove. Optionally, conflicts among policies (whether super-policies, polices not based on previously defined policies, or a combination thereof) are resolved automatically based on one or more predefined policy conflict resolution rules, manually by an administrator 4100, etc., as described in further detail hereinabove.

Thus, optionally, a super-policy may be generated based on two or more of the super-policies 4011-4013, other policies 4021-4025, or both, using the policy conflict resolution rules used when assigning the super-policies 4011-4013, other policies 4021-4025, or both, to the user group, say by the policy selector 120. Optionally, the generated super policy is then stored in the database of policies, as described in further detail hereinabove.

In one example, one user group groups together a medical services companyˇs board of directors members, a second user group groups together the companyˇs senior managers, and a third user groups together all physicians employed by the company.

In the example, the companyˇs CEO (Chief Executive Office) is also both a physician and a director, and is therefore assigned to all three groups. However, the companyˇs Vice President (VP) of Regulation is a physician but not a member of the board of directors, and is therefore assigned to the second and third user groups only, while other physicians are assigned to the third user group only.

In the example, policies assigned to two or more user groups that a user (say the VP of Regulation) is assigned to, may conflict, as described in further detail hereinabove.

Optionally, conflicts among the policies assigned to the user groups that the user is assigned to, are resolved automatically based on one or more policy conflict resolution rules, manually by an administrator 4100, etc., as described in further detail hereinabove. For example, the policies may be resolved such that the policy that belongs to a higher ranked user groups prevails (say the one of company's senior managers vs. that of physicians).

Specifically, in the example, the policy selector 120 of apparatus 1000 selects a policy for each device, based on the device's assignment to a specific one of the users 4041-4042 and on the specific users belonging to one or more of the user-groups 4031-4033, as described in further detail hereinabove.

Optionally, in the example, the policy selected by the policy selector 120 is one of the super-policies 4011-4013 or one of the policies 4021-4025 not based on previously defined policies. Alternatively, the super-policy that the policy selector 120 selects is rather generated by the policy selector 120 based on two or more of the policies (super-policies 4011-4013 and/or other policies 4021-4025), using the policy resolving rules, as described in further detail hereinabove.

Figure 3K:
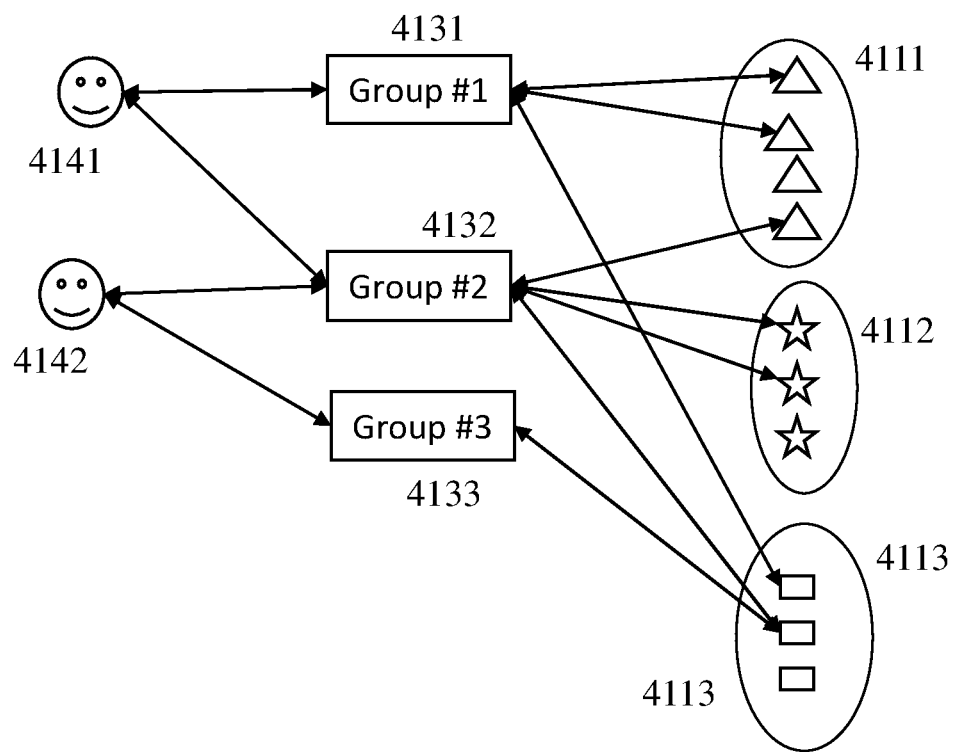
FIG. 3K is a simplified diagram illustrating a second exemplary policy conflict resolving scenario, according to an exemplary embodiment of the present invention.

Reference is now made to FIG. 3K which is a simplified diagram illustrating a second exemplary policy conflict resolving scenario, according to an exemplary embodiment of the present invention.

In one example, the policies are divided into groups that do not depend on each other (and are therefore orthogonal, as known in the art), say into groups 4111-4113, each of which groups 4111-4113 pertains to a different stage of communication with an access point, as described in further detail hereinabove.

In the example, four policies represented in FIG. 3K as triangles belong to group 4111 that pertains to a stage in which a device in use by a user receives signals of access points but is not in a process of establishing a connection to any of the access points.

Further, three policies represented in FIG. 3K as stars belong to group 4112 that pertains to a stage in which the device is in a process of establishing a connection to an active access point. Three policies represented in FIG. 3K as rectangles belong to group 4113 that pertains to a stage in which the device is already connected to an access point.

In the example, each user groups is assigned one or more polices. More specifically, a first user group 4131 is assigned with two of group 4111's policies and with one of group 4113's policies.

However, in the example, there are conflict between the two policies that belong to group 4111.

In the example, the conflicts are resolved, say using one or more policy conflict resolution rules, as described in further detail hereinabove. Then, based on the resolution of the conflicts, there is stored a super-policy that is based on the three policies assigned to the first user group 4131 and the resolution, and that pertains to the first user group 4131 in a database, as described in further detail hereinabove.

Further in the example, a second user group 4132 is assigned with two of group 4112's policies, one of group 4111's policies, and one of group 4113's policies.

However, in the example, there are conflicts between the two policies that belong to group 4112 too.

In the example, the conflicts are resolved, say using one or more policy conflict resolution rules, as described in further detail hereinabove. Then, based on the resolution of the conflicts, there is stored a super-policy that is based on the four policies assigned to the second user group 4132 and the resolution, and that pertains to the second user group 4132 in a database, as described in further detail hereinabove.

Furthermore in the example, a third user group 4133 is assigned with one of group 4111's policies, one of group 4112's policies, and one of group 4113's policies.

However, since each of the policies assigned to the third user group 4133 belongs to a different one of the orthogonal groups 4111-4113, no conflict arises, and the three policies are stored as a super-policy that pertains to the third user group 4133, as described in further detail hereinabove.

In the example, the policy selector 120 selects a policy for a device in use by a first user 4141 who belongs to two user groups 4131-4132. As a part of the selecting, the policy selector 120 determines that two super-policies (the super-policy saved in the database for the first user group 4131 and the super-policy saved in the database for the second user group 4132) apply to a device in use by the first user 4141.

Then, the policy selector 120 resolves conflicts between the two super-policies, say by choosing one super-policy over the other, and assigns the selected policy to the first user's 4141 device, as described in further detail hereinabove.

Similarly, in the example, the policy selector 120 selects a policy for a device in use by a second user 4142. As a part of the selecting, the policy selector 120 determines that both a super-policy saved in the database for the third user group 4133 and a super-policy saved in the database for the second user group 4132 apply to a device in use by a first user 4142.

Then, the policy selector 120 resolves conflicts between the super-policies, say by deciding which of two conflicting rules included in the super-policies prevails, and assigning a super-policy based on the super-policies that apply to the a device, without one of the conflicting rules, as described in further detail hereinabove.

Figure 4:
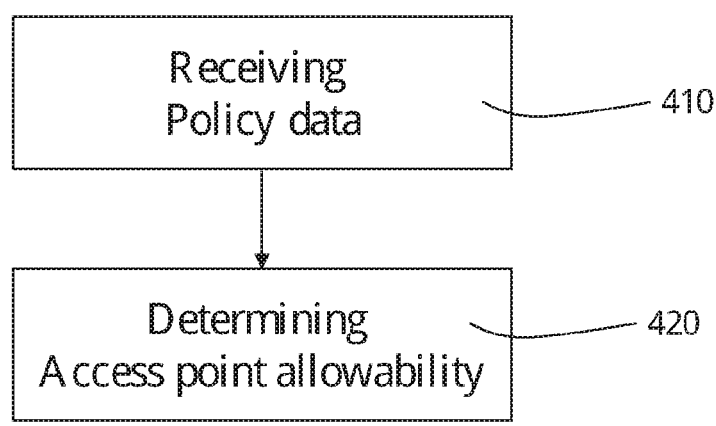
FIG. 4 is a simplified flowchart schematically illustrating a second exemplary method of distributed wireless communications access security, according to an exemplary embodiment of the present invention.

Reference is now made to FIG. 4 which is a simplified flowchart schematically illustrating a second exemplary method of distributed wireless communications access security, according to an exemplary embodiment of the present invention.

A second exemplary method for wireless communications access security, according to an exemplary embodiment of the present invention, may be executed by a computer processor of a client device. The client device may include but is not limited to: a smart mobile phone, a tablet computer, a laptop computer, a handheld POS device, a desktop computer, a controller, a telemetric device, a vehicle system, or any Internet of Things (IoT) device, etc., as described in further detail hereinabove.

For example, the first exemplary method may be executed by a client computer application such an iPhone⁺ App, which may be downloaded to the client device (say a handheld POS device, a smart phone such as an Apple⁺ iPhone or a Samsung⁺ Galaxy cellular phone or tablet computer such as an Apple⁺ iPad). The client computer application is used to implement apparatus 2000, as described in further detail hereinabove.

Optionally, an iteration of the client application's execution is triggered each time a predefined event occurs, (say whenever one of one or more events that are predefined by the application's programmer occurs), say upon the device's connecting to an access point, upon appearance of a new access point signal, etc.

Optionally, the client application's execution is triggered iteratively on a periodic basis, say every five minutes.

In the method, there may be received 410 data that defines a policy selected 320 by a server computer for the device from a database of policies, using data characterizing the device, as described in further detail hereinabove.

The selected 320 policy defines a criterion for determining which access points are allowable, say using a white list of allowed access points, a black list of forbidden access points, a list of authentication protocols that the access point has to implement in order to be allowable, etc., as described in further detail hereinabove.

Next, there is determined 420 whether access to an active (i.e. a one that generates a signal received by the client device) wireless access point is allowable, using the received 410 data defining the policy selected 320 for the device, as described in further detail hereinbelow.

Thus, in one example, an application that runs on the client device, determines 420 for each one of one or more active wireless access points (i.e. access points the signals of which are received by the client device) whether the access point is allowable. In the example, the application determines whether the access point is allowable, even before the device attempts to connect to the access point, as described in further detail hereinabove.

Then, the application indicates an allowability status for each one of the access point, to a user of the device, say using a GUI, as described in further detail hereinabove.

Optionally, the application of the example further restricts communication between the device and at least one of the active access points, which at least one access point is not determined 420 to be allowable. For example, the application may block an attempt at establishing a connection between the device and one of the access points not determined 420 to be allowable, as described in further detail hereinbelow.

In a second example, the application determines 420 whether an active wireless access point that the device attempts to establish a connection to is allowable, as the device attempts to establish a connection to that active access point.

Optionally, if the active access point is not determined 420 to be allowable, the application further restricts communication between the device and the active access point, say by stopping and blocking the device from establishing the connection, as described in further detail hereinbelow.

In a third example, an application that runs on the client device determines 420 whether a wireless access point that the device is connected to, is allowable. In the third example, the determination 420 is thus made after the connection between the device and the access point is established, as described in further detail hereinbelow.

Optionally, if the active access point is not determined 420 to be allowable, the application of the example further restricts communication between the device and the active access point. For example, the application may disconnect the device from the active access point and block the device from re-establishing the connection between the device and the active access point, as described in further detail hereinbelow.

Optionally, the exemplary method further includes a step of communicating data on compliance of the device with the policy selected 320 for the device, to the server computer, say data on a deviation of the device from the policy selected 320 for the device, or rather data that indicates device˜s sticking to the policy, as described in further detail hereinbelow.

Thus, in one example, a client application that runs on the client device is executed in a closed loop process, with iterations, such that each iteration is triggered either by one of a set of events or by expiration of a predefined waiting time window.

At every iteration, the client application checks for policy updates, by communicating with apparatus 1000, thus implementing the policy data receiver 210 functionality, as described in further detail hereinabove.

The client application further collects information about active access points (say access points in proximity of the device, the signals of which are received by the device), thus implementing some of the functionality of the access allowability determiner 220, as described in further detail hereinabove.

Then, the client application evaluates each of these access points in terms of compliance with a most recent policy received on the client device, thus implementing a remaining part of the access allowability determiner 220, as described in further detail hereinabove.

Then, the client application provides the device˜s user with an outcome of this evaluation using a GUI, say a one that presents a list of the active access points annotated with a policy compliance status to the device˜s user, as described in further detail hereinabove. Optionally, the active access points are presented to the device˜s user with explanations for incompliance where relevant.

Optionally, the client application enforces the policy with respect to one or more of the access points that are not allowable according to the policy, on the device itself.

For example, the client application may alert the user using a GUI, terminate a connection to a non-allowable active access point, shift communication to an allowable access point, block sensitive data communication, shift communication to encrypted channels, change signal power and/or device configurations, etc.

The client application further communicates data on a deviation from the policy to apparatus 1000 implemented on the server computer.

Then, upon receiving the data on the deviation on the server computer, access of the device to one or more computer resources may be restricted (say blocked or limited to viewing only), say using APIs of relevant access control systems, as described in further detail hereinabove.

Further on the server computer, information about the deviation may be sent to a third party system such as Security Information and Event Management (SIEM) systems, Cloud Access Security Brokers (CASB), Network Access Control (NAC) systems, etc., as described in further detail hereinabove.

Figure 5:
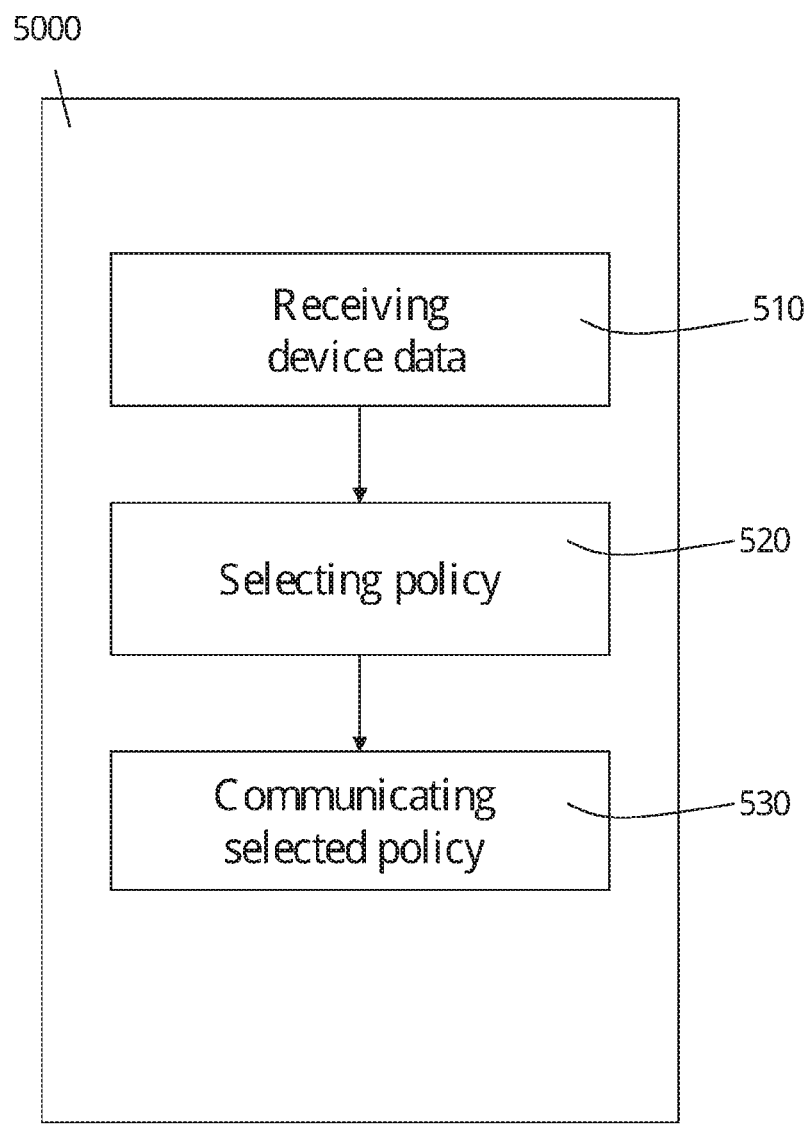
FIG. 5 is a simplified block diagram schematically illustrating a first exemplary computer readable memory storing computer executable instructions for performing steps of distributed wireless communications access security, according to an exemplary embodiment of the present invention.

Reference is now made to FIG. 5 which is a simplified block diagram schematically illustrating a first exemplary computer readable memory storing computer executable instructions for performing steps of distributed wireless communications access security, according to an exemplary embodiment of the present invention.

According to an exemplary embodiment of the present invention, there is provided a non-transitory computer readable medium 5000, such as a CD-ROM, a USB-Memory, a Hard Disk Drive (HDD), a Solid State Drive (SSD), etc.

The computer readable medium 5000 stores computer executable instructions, for performing steps of distributed wireless communications access security on a server computer, say on one or more computer processor of the server computer.

The server computer may include one or more computers, which may communicate with one or more client devices such as a smart phone (say an Apple[+] iPhone or a Samsung[+] Galaxy cellular phone), a tablet computer (say an Apple[+]

iPad), a laptop computer, a handheld POS device, etc., as described in further detail hereinabove.

The computer executable instructions include a step of receiving 510 data characterizing a device, as described in further detail hereinabove.

The device may include, but is not limited to any device used for wireless communications.

For example, the device may include, but is not limited to a mobile phone, a terminal, a laptop computer, a handheld Point-of-Sale (POS) terminal, a tablet computer, a desktop computer, a remote utilities telemetric device, a vehicle device (say a car˜s infotainment system or electric control unit), etc., as known in the art.

The device may additionally or alternatively include any device that can connect to a communications network such as the internet, which devices are commonly referred to today as: Internet-of-Things (IOT) devices˜.

The data characterizing the device may be received 510 from the device itself, from an administrator (say an administrator of apparatus 1000), from a database or file that holds information on devices in use by enterprise employees and that maps the employees to user groups, etc., as described in further detail hereinabove.

The data characterizing the device may include, but is not limited to: the device type (say a Point-of-Sale terminal vs. a smart phone or a laptop computer), data on whether the device belongs to the organization or on user group(s) that the user of the device belong to, the device˜s location, etc., as described in further detail hereinabove.

The computer executable instructions further include a step of selecting 520 a policy from a database of policies using the received 510 data characterizing the device, for the device, as described in further detail hereinabove.

The policy defines a criterion for determining which wireless access points are allowable. The policy may define the criterion using an allowable access points list (i.e. a white list), a non-allowable access points list (i.e. a black list), an indication on protocol(s) that an access point has to implement in order to be allowable, etc., or any combination thereof, as described in further detail hereinabove.

The policy may thus optionally pertain to authentication protocols, encryption protocols, etc., or any combination thereof, and indicate which protocol(s) an access point has to implement in order to be allowable, as described in further detail hereinabove.

Optionally, the policy pertains to a specific one or more stage of communication with an active (i.e. a one that generates a signal received by a client device) wireless access point.

For example, the policy may pertain to a stage of establishing a connection with the access point, to a stage of communicating with the access point over the connection, to a stage in which the device receives the access point signal but is neither connected nor trying to establish a connection with the access point, etc.

In one example, the database is a relational database, as known in the art.

In the example, each policy is represented in the database as a set of related database tables, and is associated with a key (i.e. a combination of field values) that defines the circumstances under which the policy applies, according to which key the policy is selected 520 for the device, as described in further detail hereinabove.

Thus, in the example, one policy may be associated with a key that indicates that the policy applies only if the device is a Point-of-Sale Terminal, whereas a second policy may be associated with a key that indicates that the policy applies only if the device is a smart phone or personal computer that is owned by the organization.

Optionally, the selection 520 of the policy for the device is further based on organizational data that pertains to a user of device.

For example, the policy may be associated with a key that indicates that the policy applies only if the device is a mobile device (as apposed to a desktop computer) and the user to whom the device is assigned in a database, is assigned in that database to a specific user group, as described in further detail hereinabove.

The computer executable instructions further include a step in which, after selecting 520 the policy, data defining the selected 520 policy is communicated 530 to the device, as described in further detail hereinabove.

Optionally, the data defining the selected 520 policy is communicated 530 to the device as a file or a as a message holding relevant data copied from the above mentioned relational database tables that represent the policy, say to a client application installed on the device, as described in further detail hereinabove.

In the example, the client application installed on the device receives the data defining the selected 520 policy, and uses the data to provide a user with indications on wireless access point safety, prevent or restrict communication between the device and a wireless access point, etc., as described in further detail hereinabove.

Optionally the computer executable instructions further include a step of receiving data on compliance of the device with the policy selected 520 for the device from the device, say on a deviation of the device from the policy selected 520 for the device, or on no deviation of the device from the policy in recent, as described in further detail hereinabove.

In one example, the received data is data on a deviation of the device from the policy selected 530 for the device by the server computer, say a deviation by the device˜s connecting to a wireless access point not allowed by the policy selected 530 for the device, as described in further detail hereinabove.

Optionally, in the example, the computer executable instructions further include a step in which, upon receipt of the data on the deviation, there is restricted (say blocked) access of the device (or the device˜s user) to at least one system resource based on the deviation, as described in further detail hereinabove.

The enterprise computing resources that the access may be restricted to, may include, an organization˜s internal computing resources (say databases, files, etc.), an organization˜s external computing resources (say the organization˜s Dropboxù or Microsoft⁺ Office 365 Account), etc., as described in further detail hereinabove.

Optionally, with the computer executable instructions, the access is restricted by issuing control commands to a DBMS (Database Management System) or an information system˜s user management module, based on the compliance data received from the device, as described in further detail hereinabove.

Thus, in one example, the compliance data indicates the device˜s connecting to a wireless access point that does not use any one of one or more protocols that the policy restricts to, or to a wireless access point not included in a white list defined by the policy, i.e. on a deviation from the policy.

In the example, upon receiving the data on the deviation from the policy, there are issued one or more commands that revoke access rights of a user to whom the device belongs to one or more enterprise computer resources (say databases, information systems, cloud services, etc.), as described in further detail hereinabove.

Optionally, the computer executable instructions further include a step in which, when there is later received data on positive compliance of the device with the policy selected 520 for device (say on the device's switching to an access point allowed by the policy selected 520 for the device), there is issued one or more commands. The issued one or more commands are used to return the revoked access rights to the user, as described in further detail hereinabove.

Optionally, in the example, the computer executable instructions further include a step in which, upon receipt of the data on the deviation, there is prompted an update of the policy deviated from based the deviation, as described in further detail hereinabove.

Optionally, for that prompting, the computer executable instructions trigger a process aimed at modifying the policy, say using a workflow module that initiates a workflow process in which an administrator chooses to allow or rather, to reject, a proposed modification of the policy deviated from, as described in further detail hereinabove.

For example, the administrator may be asked via an automatically generated email message, to allow an extension of a list of allowable access points defined by the policy, so as to include the wireless access point connected by the device though not allowed by the policy selected 520 for the device.

When the administrator pushes a button included in the message, the policy is updated accordingly, say by updating one or more of the relational database tables representing the policy in the relational database, for example, by extending a white list of access points, as described in further detail hereinabove.

Optionally, in one case of the example, the prompting is conditioned upon receiving data on a deviation that involves a specific access point from a number of devices, say from over one hundred devices (say per a setting of the number by an administrator of apparatus 1000). That is to say that in that case of the example, a policy is selected 520 for each respective one of several devices, and data received from each specific one of over one hundred of the devices indicates that the specific device deviates from the policy selected 520 for the specific device.

However, in that case, the deviations of the over one hundred devices involve the same wireless access point. Accordingly, in that case, the prompting allows the administrator to have one or more of the policies selected 520 for the devices updated based on those deviations, say for making that same access point allowable according to the polices, as described in further detail hereinabove.

Optionally, the computer executable instructions further include a step of gathering data on user compliance with polices in one or more logs, say on a deviation of a device in use by a user from the policy, as described in further detail hereinabove.

The compliance data (say data on the deviation of a device in use by the user from the policy) may be gathered in one or more logs, as described in further detail hereinabove. Optionally, the computer executable instructions further include a step in which at least some of the gathered data is forwarded to one or more systems in use by an organization that operates the server computer, to information systems in use by one or more other organizations, etc., as described in further detail hereinabove.

Optionally, the computer executable instructions further include one or more preliminary steps of defining the policies and storing the defined policies in the database, as described in further detail hereinabove.

Optionally, the computer executable instructions further include one or more preliminary steps of resolving conflicts among the defined policies, and storing the conflict-resolved policies in the database, as described in further detail hereinabove.

Optionally, the computer executable instructions further include a preliminary step of defining the policies, as described in further detail hereinabove.

Figure 6:
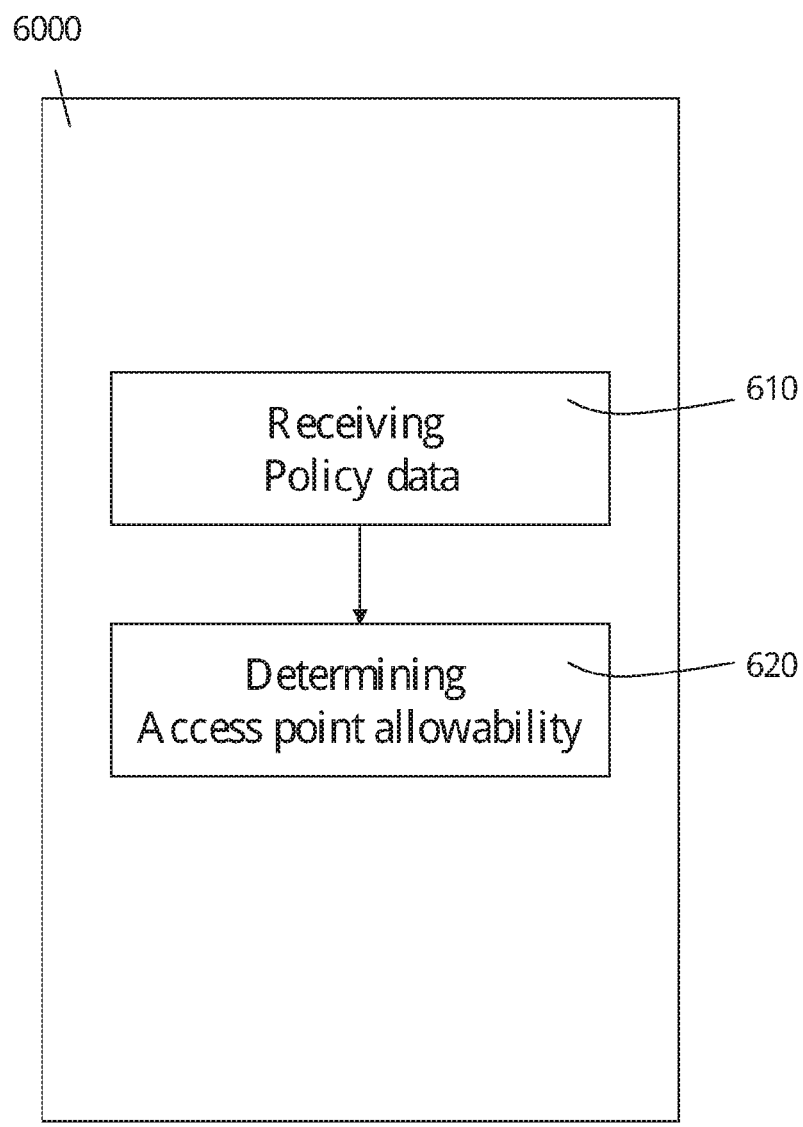
FIG. 6 is a simplified block diagram schematically illustrating a second exemplary computer readable memory storing computer executable instructions for performing steps of distributed wireless communications access security, according to an exemplary embodiment of the present invention.

Reference is now made to FIG. 6 which is a simplified block diagram schematically illustrating a second exemplary computer readable memory storing computer executable instructions for performing steps of distributed wireless communications access security, according to an exemplary embodiment of the present invention.

According to an exemplary embodiment of the present invention, there is provided a non-transitory computer readable medium 6000 that stores computer executable instructions for performing steps of distributed wireless communications access security on a client device, as described in further detail hereinabove.

The client device may include but is not limited to a smart cellular phone, a tablet computer, a laptop computer, a handheld POS terminal, a desktop computer, etc., or any device that can communicate with a wireless access point, as described in further detail hereinabove.

The computer readable medium 6000 may include, but is not limited to: a RAM (Rapid Access Memory), a DRAM (Dynamic RAM), a ROM (Read Only Memory), a PROM (Programmable ROM), an EPROM (Erasable ROM), a Micro SD (Secure Digital) Card, a CD-ROM, a Solid State Drive (SSD), a USB-Memory, a Hard Disk Drive (HDD), etc.

The computer readable medium 6000 stores computer executable instructions, for performing steps of distributed wireless communications access security.

Optionally, the instructions are in a form of a computer application such an iPhone⁺ App, which may be downloaded to the user's device (say Apple⁺ iPhone), stored on the computer readable medium 6000 (say on the phone's ROM), and executed on the device's processor, as described in further detail hereinabove.

The computer executable instructions include a step of receiving 610 data that defines a policy selected by a server computer for the device from a database of policies, using data characterizing the device, as described in further detail hereinabove.

The selected policy defines a criterion for determining which access points are allowable, say using a white list of allowed access points, a black list of non-allowable access points, a list of protocols that an access point has to implement in order to be allowable, etc., as described in further detail hereinabove.

The computer executable instructions further include a step of determining 620 whether access to an active (i.e. a one that generates a signal received by the client device) wireless access point is allowable, using the received 610 data defining the policy selected for the device, as described in further detail hereinabove.

Thus, in one example, the computer executable instructions include determining 620 for one or more active wireless access points, whether the access point is allowable, before the device even attempts to connect to the active access point, as described in further detail hereinabove.

In the example, the computer executable instructions indicate an allowability status for each one of the access points to a user of the device, say using a GUI, as described in further detail hereinabove.

Optionally, in the example, when one or more of the active access points are not determined 620 to be allowable, the computer executable instructions further restrict communication between the device and the access points not determined 620 to be allowable, as described in further detail hereinabove.

For example, the computer executable instructions may block an attempt at establishing a connection between the device and an active wireless access point that is not determined 620 to be allowable, as described in further detail hereinabove.

In a second example, the computer executable instructions further include a step of determining 620 whether an active wireless access point that the device attempts to establish a connection to is allowable, as the device attempts to establish the connection to that active access point.

Optionally, if the active access point that the device attempts to establish the connection to is not determined 620 to be allowable, the computer executable instructions restrict the communication between the device and the active access point. For example, the communication may be restricted by stopping and blocking the device from establishing the connection, as described in further detail hereinabove.

In a third example, the computer executable instructions further include a step of determining 620 whether a wireless access point that the device is already connected to, is allowable. In the third example, the determination 620 is thus made after the connection between the device and the access point is established, as described in further detail hereinabove.

Optionally, if the active access point that the device is connected to is not determined 620 to be allowable, the computer executable instructions restrict the communication between the device and the active access point. For example, the device may be disconnected from the active access point and blocked from re-establishing the connection between the device and the active access point, as described in further detail hereinabove.

Optionally, the computer executable instructions further include a step of communicating data on compliance of the device with the policy selected for the device to the server computer, say data on a deviation of the device from the policy selected for the device, as described in further detail hereinabove.

It is expected that during the life of this patent many relevant devices and systems will be developed and the scope of the terms herein, particularly of the terms 'Computer_', 'Processor_', 'Server Computer_', 'Client Device_', 'Access Point_', 'Wireless Access Point_', 'Tablet_', 'Smart Phone_', 'Laptop_', 'CD-ROM_', 'USB-Memory_', 'Hard Disk Drive (HDD)_', 'Solid State Drive (SSD)_', 'DRAM_', 'ROM_', 'PROM_', 'EPROM_', 'DRAM_', 'Micro SD_', 'Wi-Fi_', 'WLAN_', 'Internet_ and 'Internet of Things_ is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method of distributed wireless communications access security, the method comprising steps a computer processor of a server computer is programmed to perform, the steps comprising:
   receiving data characterizing a device;
   selecting a policy from a database of policies according to the received data characterizing the device, for the device, the policy defining a criterion for determining which wireless access points are allowable; and
   communicating data defining the selected policy to the device, for the device to use for determining whether access to an active wireless access point is allowable.

2. The method of claim 1, further comprising receiving data on compliance of the device with the policy selected for the device from the device.

3. The method of claim 1, further comprising receiving data on a deviation of the device from the policy selected for the device from the device.

4. The method of claim 1, further comprising receiving data on compliance of the device with the policy selected for the device from the device, and prompting an update of the policy deviated from based on the compliance.

5. The method of claim 1, further comprising receiving data on a deviation of the device from the policy selected for the device from the device, and prompting an update of the policy deviated from based on the deviation.

6. The method of claim 1, further comprising receiving data on a deviation of the device from the policy selected for the device from the device, and restricting access of a user of the device to at least one computing resource based on the deviation.

7. The method of claim 1, further comprising preliminary steps of defining the policies and storing the defined policies in the database.

8. The method of claim 1, further comprising preliminary steps of defining the policies, resolving conflicts among the defined policies, and storing the conflict-resolved policies in the database.

9. The method of claim 1, wherein the selected policy pertains to a protocol used by a wireless access point.

10. The method of claim 1, wherein the selected policy is defined so as to be applied according to a stage of communication with a wireless access point.

11. Apparatus for distributed wireless communications access security, the apparatus comprising:
   a computer processor of a server computer;
   a device data receiver, implemented on the computer processor, configured to receive data characterizing a device;
   a policy selector, in communication with the device data receiver, configured to select a policy from a database of policies according to the received data characterizing the device, for the device, the policy defining a criterion for determining which access points are allowable; and a policy data communicator, in communication with the policy selector, configured to communicate data defining the selected policy to the device, for the device to use for determining whether access to an active wireless access point is allowable.

12. The apparatus of claim 11, further comprising a compliance data receiver, configured to receive data on compliance of the device with the policy selected for the device from the device.

13. The apparatus of claim 11, further comprising a compliance data receiver, configured to receive data on a deviation of the device from the policy selected for the device from the device.

14. A non-transitory computer readable medium storing computer processor executable instructions for performing steps of distributed wireless communications access security, the steps comprising:

receiving data characterizing a device;

selecting a policy from a database of policies according to the received data characterizing the device, for the device, the policy defining a criterion for determining which access points are allowable; and communicating data defining the selected policy to the device, for the device to use for determining whether access to an active wireless access point is allowable.

15. A computer implemented method of distributed wireless communications access security, the method comprising steps a computer processor of a device is programmed to perform, the steps comprising:

receiving data defining a policy selected by a server computer for the device from a database of policies according to data characterizing the device, the policy defining a criterion for determining which wireless access points are allowable; and determining whether access to an active wireless access point is allowable, using the received data defining the policy selected for the device.

16. The method of claim 15, further comprising a step of communicating data on compliance of the device with the policy selected for the device to the server computer.

17. The method of claim 15, further comprising a step of communicating data on a deviation of the device from the policy selected for the device to the server computer.

18. Apparatus for distributed wireless communications access security, the apparatus comprising:

a computer processor of a device;

a policy data receiver, implemented on the computer processor, configured to receive data defining a policy selected by a server computer for the device from a database of policies according to data characterizing the device, the policy defining a criterion for determining which wireless access points are allowable; and an access allowability determiner, in communication with said policy data receiver, configured to determine whether access to an active wireless access point is allowable, using the received data defining the policy selected for the device.

19. The apparatus of claim 18, further comprising a compliance data communicator, configured to communicate data on compliance of the device with the policy selected for the device to the server computer.

20. The apparatus of claim 18, further comprising a compliance data communicator, configured to communicate data on a deviation of the device from the policy selected for the device to the server computer.

21. A non-transitory computer readable medium storing computer processor executable instructions for performing steps of distributed wireless communications access security on a device, the steps comprising:

receiving data defining a policy selected by a server computer for the device from a database of policies according to data characterizing the device, the policy defining a criterion for determining which access points are allowable; and determining whether access to an active wireless access point is allowable, using the received data defining the policy selected for the device.

\* \* \* \* \*